United States Patent
Kalynushkin et al.

(10) Patent No.: US 8,142,569 B2
(45) Date of Patent: *Mar. 27, 2012

(54) APPARATUS FOR FORMING STRUCTURED MATERIAL FOR ENERGY STORAGE DEVICE AND METHOD

(75) Inventors: Yevgen Kalynushkin, Pompano Beach, FL (US); Peter Novak, Ft. Lauderdale, FL (US)

(73) Assignees: Nanoener Technologies, Inc., Ft. Lauderdale, FL (US); Ener1, Inc., New York, NY (US)

(*) Notice: Subject to any disclaimer, the term of this patent is extended or adjusted under 35 U.S.C. 154(b) by 1470 days.

This patent is subject to a terminal disclaimer.

(21) Appl. No.: 11/561,531

(22) Filed: Nov. 20, 2006

(65) Prior Publication Data

US 2007/0277370 A1    Dec. 6, 2007

Related U.S. Application Data

(62) Division of application No. 11/560,922, filed on Nov. 17, 2006, now Pat. No. 7,717,968.

(60) Provisional application No. 60/780,240, filed on Mar. 8, 2006.

(51) Int. Cl.
C23C 16/00 (2006.01)
C23C 16/455 (2006.01)
C23C 16/54 (2006.01)

(52) U.S. Cl. ........ 118/718; 118/100; 118/101; 118/106; 118/109; 118/110; 118/111; 118/112; 118/118; 118/123; 118/308; 118/319; 118/324; 118/325

(58) Field of Classification Search .......... 118/718, 118/100, 101, 106, 109, 110, 111, 112, 118, 118/123, 308, 319, 324, 325

See application file for complete search history.

(56) References Cited

U.S. PATENT DOCUMENTS

| | | | | |
|---|---|---|---|---|
| 2,255,294 A * | 9/1941 | Malton et al. | ............... | 118/308 |
| 2,472,551 A * | 6/1949 | Smith | ............... | 264/131 |
| 2,579,778 A * | 12/1951 | Allen | ............... | 427/354 |
| 2,775,532 A * | 12/1956 | Sallie et al. | ............... | 427/199 |
| 4,371,568 A * | 2/1983 | von Tell | ............... | 427/140 |
| 4,815,414 A | 3/1989 | Duffy et al. | | |

(Continued)

FOREIGN PATENT DOCUMENTS

JP    2006-59641 A    3/2006

(Continued)

OTHER PUBLICATIONS

Notice of Grant related Russian Application mailed Jul. 4, 2011.*

Primary Examiner — Jeffrie R Lund
(74) Attorney, Agent, or Firm — Novak Druce & Quigg LLP

(57) ABSTRACT

A method and an apparatus of the present invention is used for the high-rate deposition of materials, such as carbon, silicon, metals, metal oxides, and the like, onto a metal substrate defined by a metal tape. The particles of the material are mixed with fluid and are injected against the metal tape at high pressure and high velocity. The particles of the material form a current collection surface of the metal tape. The metal tape is used as cathode or anode combined with a separator to form a fuel cell of a secondary battery, metal-ceramic membranes, film composite metal-ceramic materials for electronic devices.

15 Claims, 20 Drawing Sheets

U.S. PATENT DOCUMENTS

| | | | |
|---|---|---|---|
| 5,302,414 | A | 4/1994 | Alkhimov et al. |
| 6,402,050 | B1 | 6/2002 | Kashirin et al. |
| 6,706,431 | B2 | 3/2004 | Kawamura et al. |
| 6,761,744 | B1 | 7/2004 | Tsukamoto et al. |
| 6,800,399 | B2 | 10/2004 | Matsumoto |
| 7,717,968 | B2 * | 5/2010 | Kalynushkin et al. ....... 29/623.5 |
| 2002/0177032 | A1 | 11/2002 | Suenaga et al. |
| 2003/0203282 | A1 | 10/2003 | Grugeon et al. |
| 2004/0137326 | A1 | 7/2004 | Munshi |
| 2004/0185343 | A1 | 9/2004 | Wang et al. |
| 2004/0191607 | A1 | 9/2004 | Nobuta et al. |
| 2004/0197654 | A1 | 10/2004 | Barker et al. |
| 2004/0202937 | A1 | 10/2004 | Barker et al. |
| 2004/0248010 | A1 | 12/2004 | Kato et al. |
| 2005/0191555 | A1 | 9/2005 | Kelley et al. |
| 2006/0051677 | A1 | 3/2006 | Matsushima et al. |
| 2006/0175704 | A1 | 8/2006 | Shimizu et al. |
| 2007/0209584 | A1 * | 9/2007 | Kalynushkin et al. ........ 118/311 |
| 2007/0218258 | A1 * | 9/2007 | Nees et al. .................... 428/209 |
| 2007/0218366 | A1 * | 9/2007 | Kalynushkin et al. ........ 429/232 |
| 2007/0224513 | A1 * | 9/2007 | Kalynushkin et al. ........ 429/236 |
| 2007/0277370 | A1 * | 12/2007 | Kalynushkin et al. .......... 29/730 |
| 2009/0304924 | A1 * | 12/2009 | Gadgil ....................... 427/255.5 |
| 2010/0117255 | A1 * | 5/2010 | Inoue et al. ................... 264/129 |

FOREIGN PATENT DOCUMENTS

| | | | |
|---|---|---|---|
| RU | 95107314 | A1 * | 5/1995 |
| RU | 2 098 895 | C1 * | 12/1997 |

\* cited by examiner

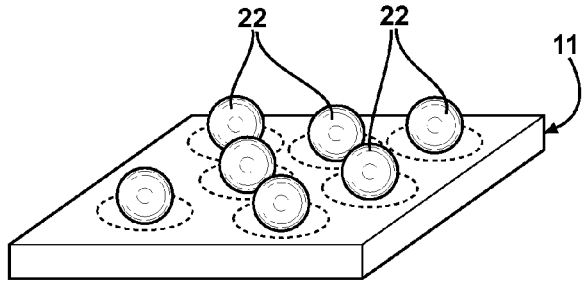
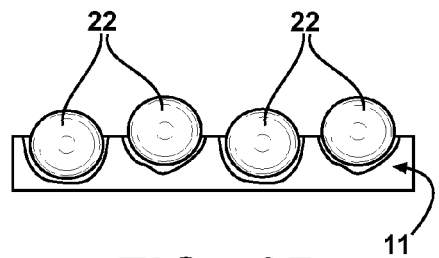
FIG - 3A  FIG - 3B
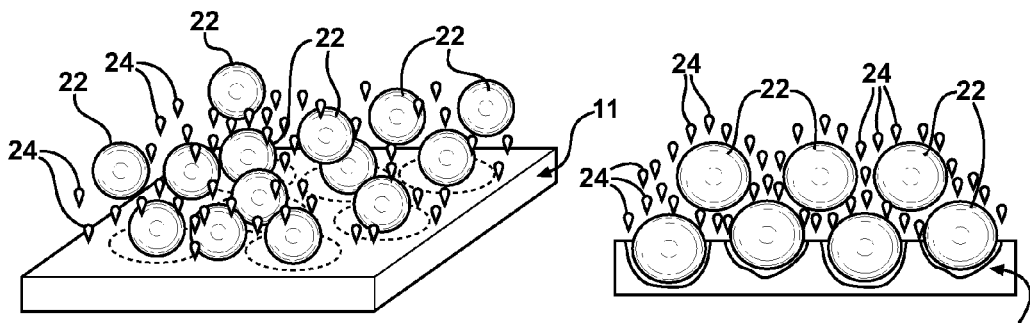
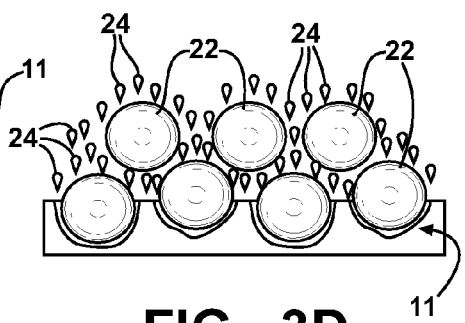
FIG - 3C  FIG - 3D
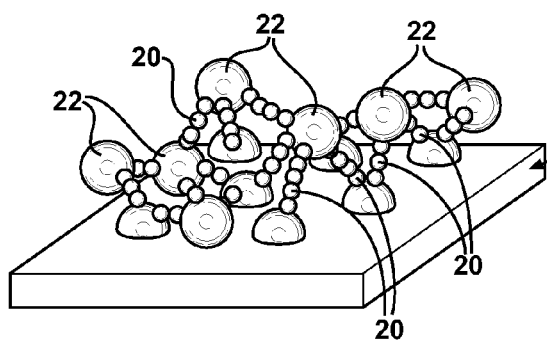
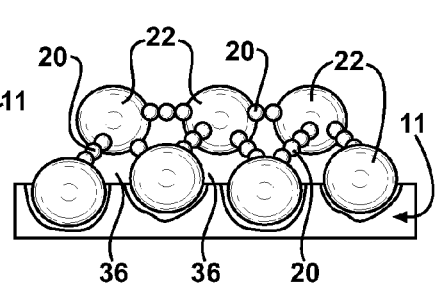
FIG - 3E  FIG - 3F

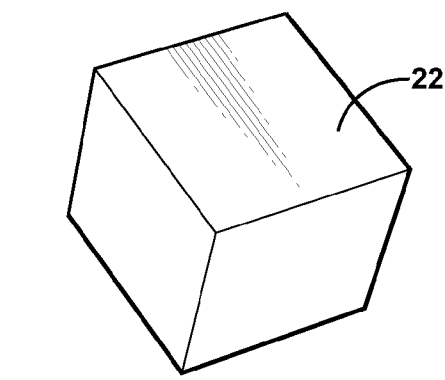
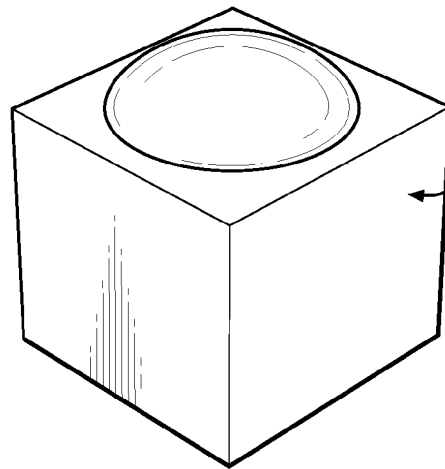
FIG - 4A
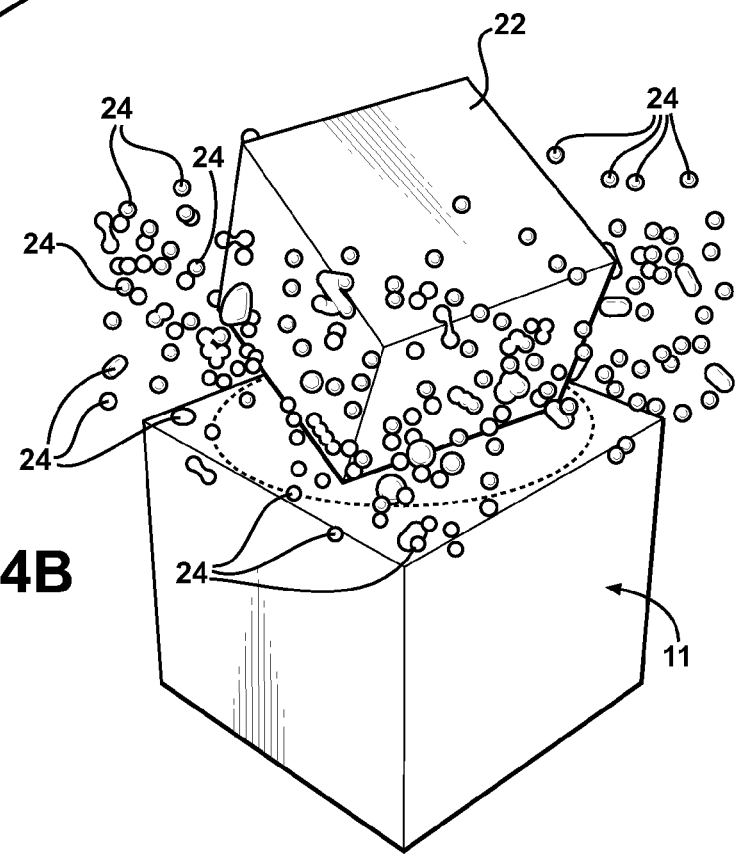
FIG - 4B

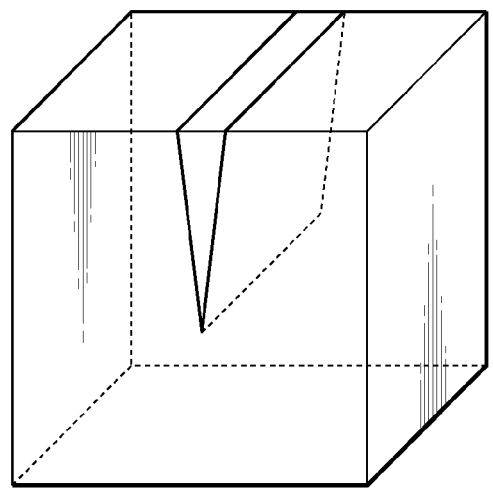
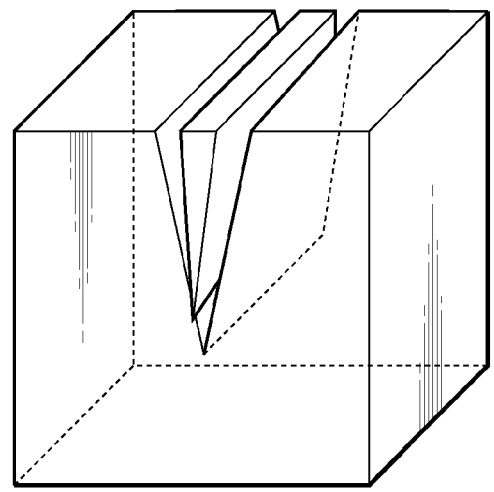
FIG - 5A   FIG - 5B
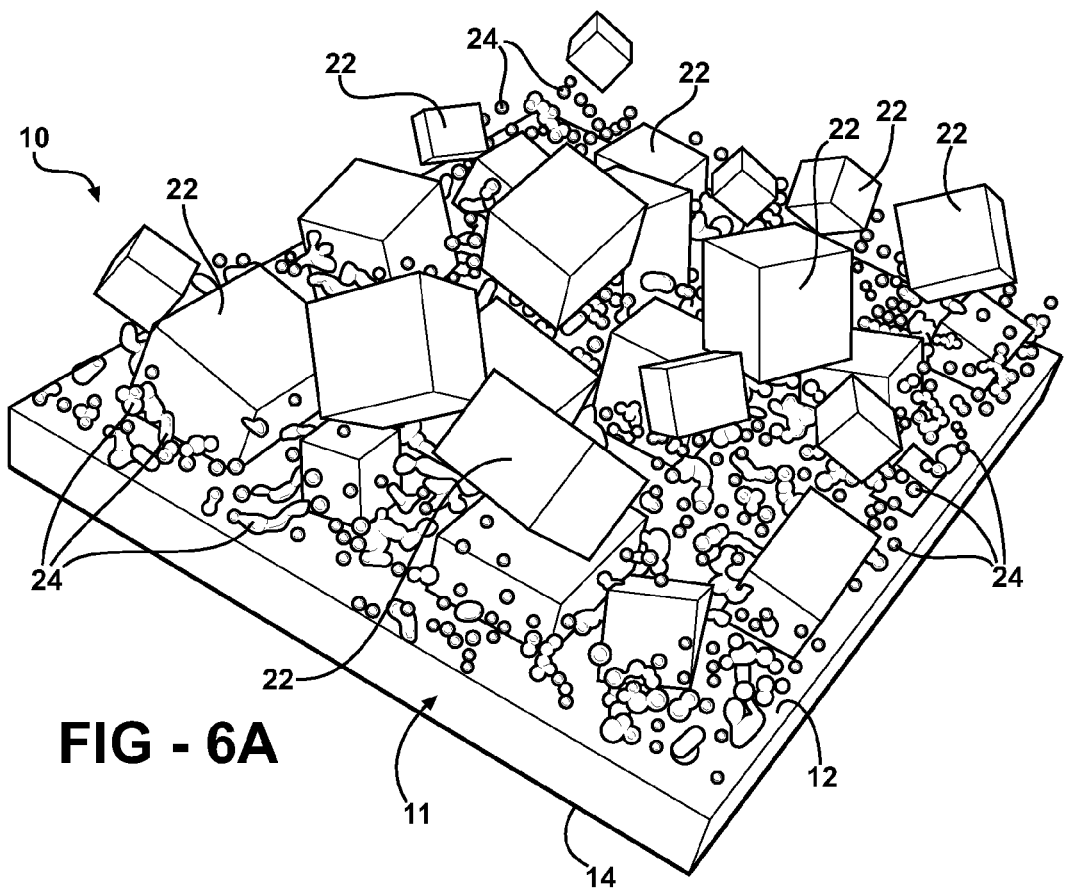
FIG - 6A

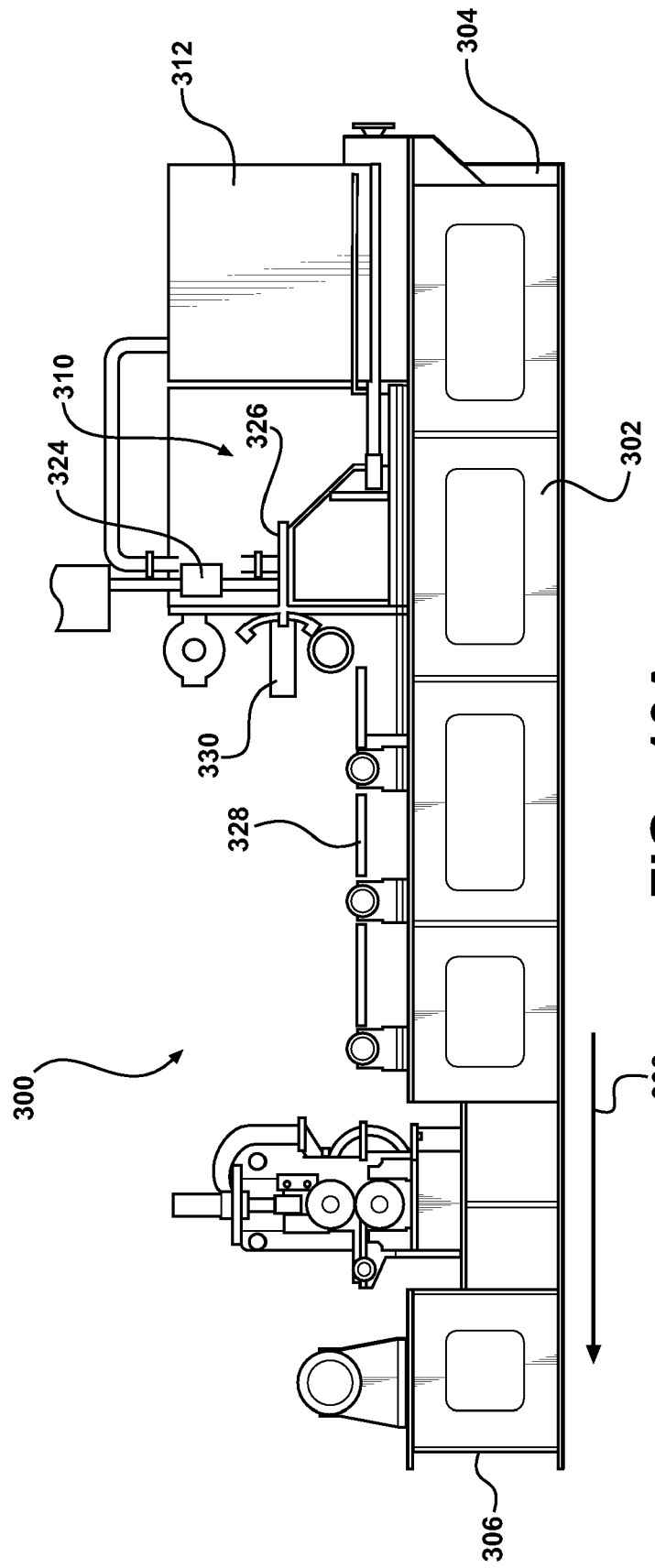

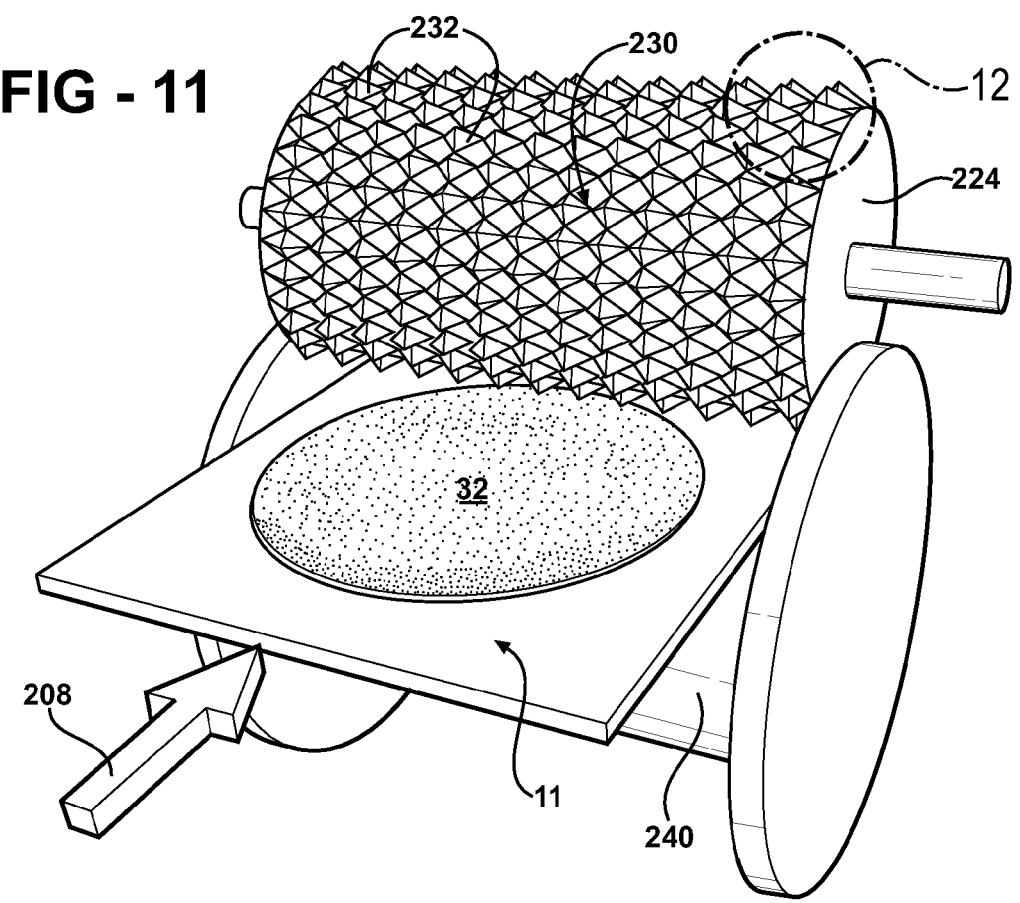
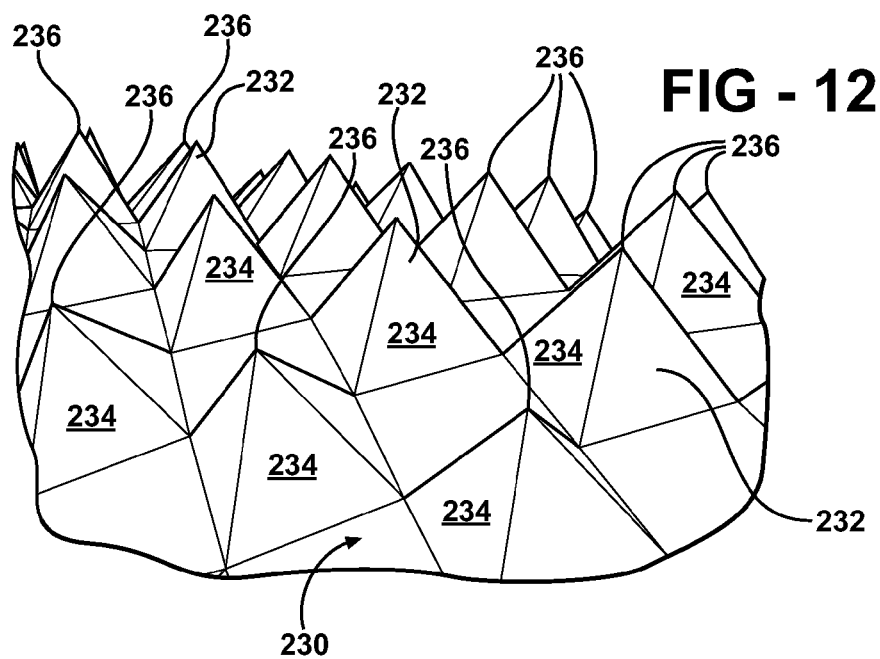

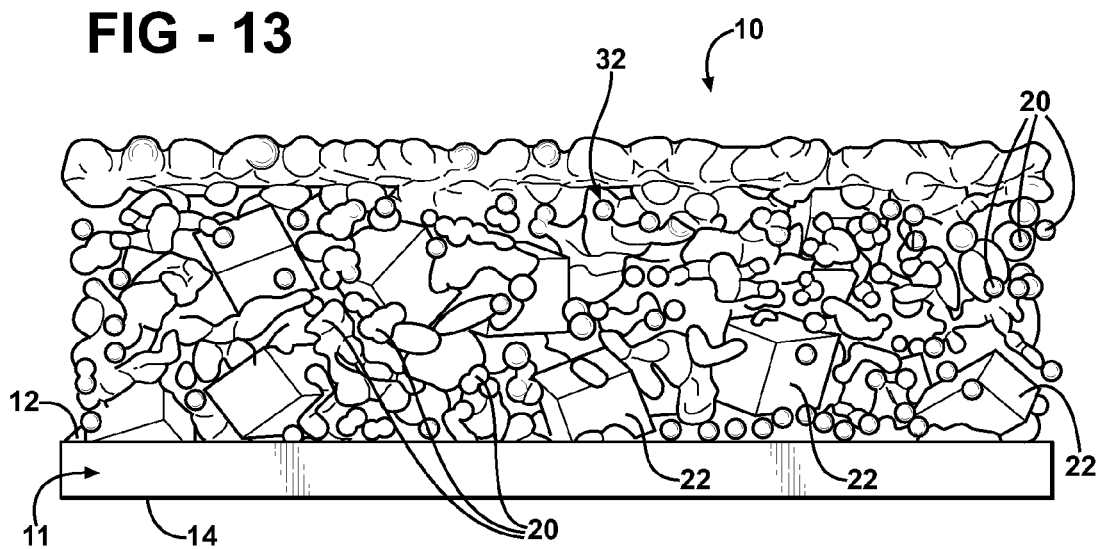
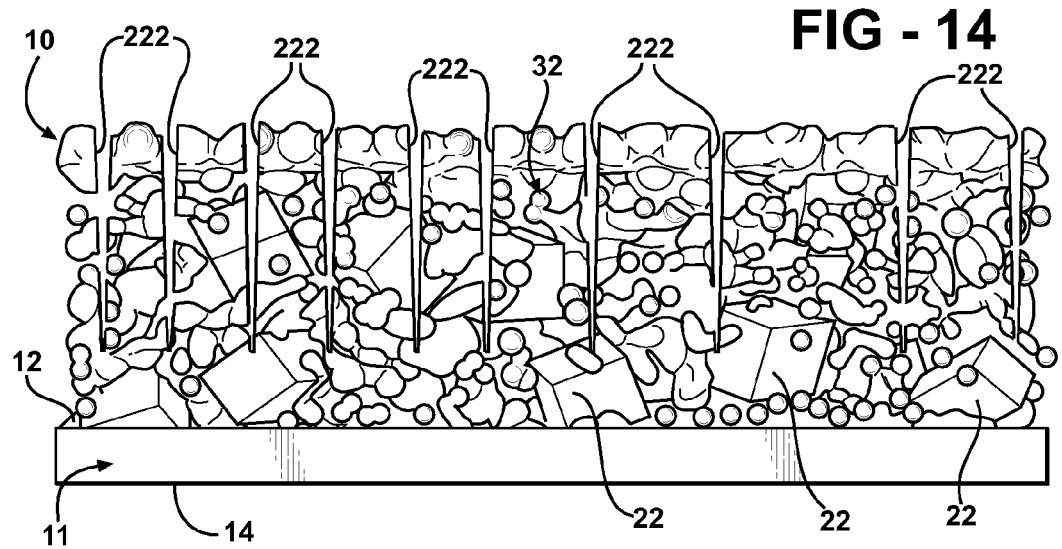

APPARATUS FOR FORMING STRUCTURED MATERIAL FOR ENERGY STORAGE DEVICE AND METHOD

RELATED APPLICATIONS

This is a divisional application of a patent application Ser. No. 11/560,922 filed Nov. 17, 2006 which claims priority to provisional application Ser. No. 60/780,240 filed Mar. 8, 2006 and incorporated herewith in its entirety

FIELD OF THE INVENTION

The subject invention relates to an apparatus and method for manufacturing an electrode for a cell having improved cell charged capacity, C-rate performance and recycling stability.

BACKGROUND OF THE INVENTION

The term "nanotechnology" generally refers to objects, systems, mechanisms and assemblies smaller than one ten of micron and larger than 1 nm. In recent years nanotechnology has been used to make products, that is, raw materials are processed and manipulated until the desired product is achieved. In contrast, nanotechnology mimics nature by building a product from the ground up using a basic building block—the atom. In nanotechnology atoms are arranged to create the material needed to create other products. Additionally, nanotechnology allows for making materials stronger and lighter such as carbon nanotube composite fibers.

One of the areas of continuous development and research is an area of energy conversion devices, such as for example secondary batteries capable of charging electricity after discharge and having at least one electrochemical cell. The cell includes a pair of electrodes and an electrolyte disposed between the electrodes. One of the electrodes is called a cathode wherein an active material is reduced during discharge. The other electrode is called an anode wherein another active material is oxidized during discharge. Secondary batteries refer to batteries capable of charging electricity after discharge. Recently, intensive research has been conducted on lithium secondary batteries because of their high voltage and high energy density. The typical lithium metallic or lithium ion battery has an anode containing an active material for releasing lithium ions during discharge. The active material may be metallic lithium and an intercalated material being capable of incorporating lithium between layers. The active material is deposited or coated upon a metal current collector formed from a metal tape to increase electro-conductive characteristics of at least one of the electrodes.

Alluding to the above, various methods for deposition of the active materials onto the metal current collector have been used in the prior art applications. One of these methods is physical vapor deposition (PVD), which includes E-beam evaporation, flash (thermal) evaporation, plasma evaporation and DC or RF sputtering deposition, is currently used to generate thin films on substrates, i.e. the metal current collector. However, this method includes numerous disadvantages, such as, for example, non-time effective deposition rates as relate to coating thickness of the substrate per unit, typically in the range of a few microns per minute. Another method is known as chemical vapor deposition (CVD), including rapid thermal CVD, or RT CVD, results non-time effective deposition of the coating onto the substrate. Sputtering techniques such as RF or DC sputtering, as well as laser evaporation, plasma arc evaporation, electro-spark deposition (ESD), and the like are also known to have low deposition rates or not sufficient adhesion strength to the current collector. Moreover, all of the aforementioned methods are performed by and require expensive vacuum equipment and do not provide strong adhesion of the coating to the substrate, which is detrimental in various applications, particularly in manufacturing electrodes for energy conversion devices, such as batteries.

These aforementioned methods are proven to achieve rates of tens of microns per minute. However, if the deposition rates of these methods are increased to higher rates, it may adversely impact adhesion of the coating upon the substrate. As such, these methods are limited to deposition of the coating that results in a range of 10-20 $\mu$m per minute, which has limited industrial application, such as to production of a very thin battery of the type used in electronic devices. However, these prior art methods are not cost effective when used in a production of other types of batteries, such as, for example, batteries for vehicles, and the like.

Alluding to the above, another method, which uses vacuum, was also applied in fabrication of the substances of the electrodes. However, this method had negatively impacted the crystalline composition of the materials deposited upon the substrate. Those skilled in the art will appreciate that a shortage of oxygen in spinel phases leads to transformation of cubic crystal matrix to tetragonal one, which negatively affects electrochemical properties. The usage of carbon as a conductive agent, in some of the prior art applications, presents numerous disadvantages because of the lower electrical conductivity of the carbon as compared to metals, thereby creating additional voltage drop at the interface with the metal current collector.

The art is replete with various other methods and apparatuses for forming metal current collector for electrodes of a battery cell, which are disclosed in the United States Patent Publication Application Nos. 20020177032 to Suenaga; 20030203282 to Grugeon; 20040248010 to Kato et al.; and the U.S. Pat. No. 6,761,744 to Tsukamato et al. Other United States Patent Publication Nos. 20040197654 to Barker et al.; 20040202937 to Barker et al.; 20040185343 to Wang et al.; and 20040137326 to Munshi disclose various methods of electrode production, which use coating process, wherein ground particles of active substance and current conducting material are mixed with solution and organic binder to form a paste-like mixture or slurry. A current conducting collector is covered with the paste-like mixture, rolled, and dried. The electrodes used by the aforementioned "coating" method are known to have limited points of contact as defined between the ground particles of active substance and current conducting material and the current collector which drastically reduces the porosity of the current collector. The U.S. Pat. No. 6,800,399 to Matsumoto teaches an electrode substrate formed by mechanically processing a nickel foil so as to be made three dimensional through the creation of concave and convex parts, and then, this substrate is filled with active material or the like so that an electrode is manufactured. The concave and convex parts are rolling pressed to incline in one direction. Furthermore, an electrode for a secondary battery is formed by using the above described method. This method has a major disadvantage such as low permittivity due to a large amount of metal constituent. This method is non-cost effective because it depends upon special mechanical processing and equipment.

These aforementioned prior art methods share at least one disadvantage such as the active layer formed on top of the metal current collector of the electrodes to define a space therebetween, which negatively impacts specific power and energy, cycleability and possibility to properly function in applications requiring higher C-rate. The aforementioned methods negatively impact both the life span of the battery and the manufacturing costs associates therewith is the structure of the battery wherein the active layer is formed on the metal current collector and additional binders used as adhesion between the active layer and the metal current collector thereby increasing both the weight and size of the battery, which, as mentioned above, negatively impacts both the impedance characteristics of the battery and the manufacturing costs associated therewith.

Alluding to the above, none of these prior art references teaches the method of forming the electrode which would satisfies majority of the requirements, such as, for example, accessible porosity sufficient for penetration of electrolyte to contact with particles of the active material, a conducting agent, which should provide contact of the active material with a metal current collector and constitute no more than 10-20% of the active substance weight. In the normal process of gas dynamic evaporation accelerated to supersonic speed metallic particles form a coating on the substrate as a result of their plastic deformation. The usage of this method for electrodes production is significantly limited. The ceramic particles of active material are inculcated in the metal current collector and do not form the necessary porosity. Mixing a metal powder the ceramic components results in plastic deformation of the metal particles as they collide with the ceramic particles. In response to the plastic deformation, the metal particles create films on the ceramic particles resulting in low adhesion strength. The resulting material does not have sufficiently accessible pore structure and have poor mechanic strength.

But even with the aforementioned technique, to the extent it is effective in some respect, there is always a need for an improved processes for engineering of porous electrodes that is light, thin, cost effective, have improved life-span and ability to properly function in applications that depend upon higher C-rate and easy to manufacture.

SUMMARY OF THE INVENTION

An apparatus of the present invention forms a cell for producing electric power, which has a first electrode and a second electrode formed from a metal current collector with at least one of first and second electrodes including a plurality of first particles of active material and a plurality of second particles formed from a material other than the active material and being integral with the metal current collector. The first and second particles interconnect with one another to form a grid of active layer with the first particles disposed within the grid. The apparatus includes a work surface or work station presenting terminal ends. A deposition device is disposed at one of the terminal ends for processing the metal current collector and deposing the first particles of active material onto the metal current collector. A rolling device is spaced from the deposition device for collecting the metal current collector into at least one roll.

A calibrating mechanism is disposed between the deposition device and the rolling device for frictionally engaging the grid of active layer and at least partially entering into the grid and forming additional pores of the grid thereby increasing porosity of the grid. At least one roller of the calibrating mechanism includes a peripheral wall with a plurality of spikes extending radially outwardly from the peripheral wall. A recycling mechanism collects the excess of the particles of active material from the calibrating mechanism and the roller device and returns the particles of active material back to the deposition device to be applied to the metal current collector.

A controller is operably communicated with a Digital Process Parameter Control unit (DPPC). The controller includes a comparative software, which stores pre-determined size of the particles of active material and the predetermined dimensions of the continuous surface of the metal current collector. The controller determines the offset between the particles of active material as applied onto the metal current collector and offset of the dimensions of the continuous surface.

An advantage of the present invention is to provide a unique metal current collector of an electrode with integrated active core having a porous structure received by effective deposition of an active material onto the metal current collector substrate in a binder free fashion while maintaining outstanding adhesion.

Another advantage of the present invention is to provide a unique method for fabricating the electrodes wherein the metal current collector presents nano-structured surface at low cost.

Still another advantage of the present invention is to provide an electrode material having an improved nano-structure which is utilized as at least cathode or anode of a cell leading to low thermal stability and improved live-span.

Still another advantage of the present invention is to provide a unique method of forming the inventive electrode structure for the cell by virtue of a unique high-pressure deposition solidification method wherein the particles of active material and solidified drops formed as a result of formation of aerosol mixture form a grid presenting a continuous surface of the metal current collector of the electrode.

Still another advantage of the present invention is to provide the metal current collector for the electrode presenting stable operation in a broad range of discharge rates and operating temperatures.

Still another advantage of the present invention is to provide high-performance equipment and methodology for high speed deposition of the particle of the active material while suppressing possible thermo-chemical degradation.

Still another advantage of the present invention is to provide an apparatus and method for fabrication an electrode having improved electrochemical characteristics and low impedance.

Still another advantage of the present invention is to provide an apparatus that is easily adaptable to multiple production applications including and not limited to individual shops and large manufacturing facilities.

The present inventive concept has various applications including and not limited to high efficiency thin-film photovoltaic solar cells for cost-effective renewable energy, fuel cell components such as catalytic membranes for environmentally friendly power supplies, super capacitors for smaller and lighter portable handheld devices such as cell phones, laptops, thin film sensors for more effective monitoring and control of temperature, illumination, and humidity, high-conductivity wires with low resistance adaptable for manufacturing of a wide variety of electronic devices, and the like.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3A illustrates is a perspective and segmental view of the metal current collector and the particles of active material colliding therewith thereby melting the metal current collector with some particles partially entering the metal current collector;

FIG. 3B is a partially cross sectional view of the metal current collector of FIG. 3A;

FIG. 3C illustrates is a perspective and segmental view of the metal current collector and the metal drops splashed from the metal current collector in response to ultrasonic cavitations of the melted metal of the current collector;

FIG. 3D is a partially cross sectional view of the metal current collector of FIG. 3C;

FIG. 3E illustrates is a perspective and segmental view of the metal current collector and the metal drops solidified in the shaped of the second particles and interconnected with the particles of active material to form a grid of a porous structure of an active layer on the metal current collector;

FIG. 3F is a partially cross sectional view of the metal current collector of FIG. 3E;

FIG. 4A is a fragmental view of two particles when one of the particles is represented by a drop of melted metal formed on its surface.

FIG. 4B illustrates the particles shown in FIG. 4A after the impact therebetween whereby the additional metal drops splashing takes place;

FIGS. 5A and 5B illustrate another fragmental views of the particles of the active material, whereby additional pores are form as a result of volumetric effect during the metal melt solidification inside cracks formed in the particles of active material;

FIG. 6A illustrates a structure formation of the inventive electrodes having thick configuration wherein the particles of the active material are represented by crystals of cubic and tetragonal morphology interacted with each other and the drops of the melted metal formed from the current collector;

FIG. 10A shows a front view of an alternative embodiment of the apparatus of FIG. 10;

FIG. 11 shown a perspective view of a calibration mechanism of the apparatus shown in FIG. 10 having a calibration roller designed for calibrating the tape of the metal current collector;

FIG. 12 shows a fragmental view of a work-surface of the calibration roller of FIG. 11;

FIG. 13 illustrates a cross sectional view of the metal current collector with the inventive active layer before calibration;

FIG. 14 illustrates a cross sectional view of the metal current collector of FIG. 13 with the inventive active layer after calibration;

DETAILED DESCRIPTION OF THE PREFERRED EMBODIMENT

Figure 1A:
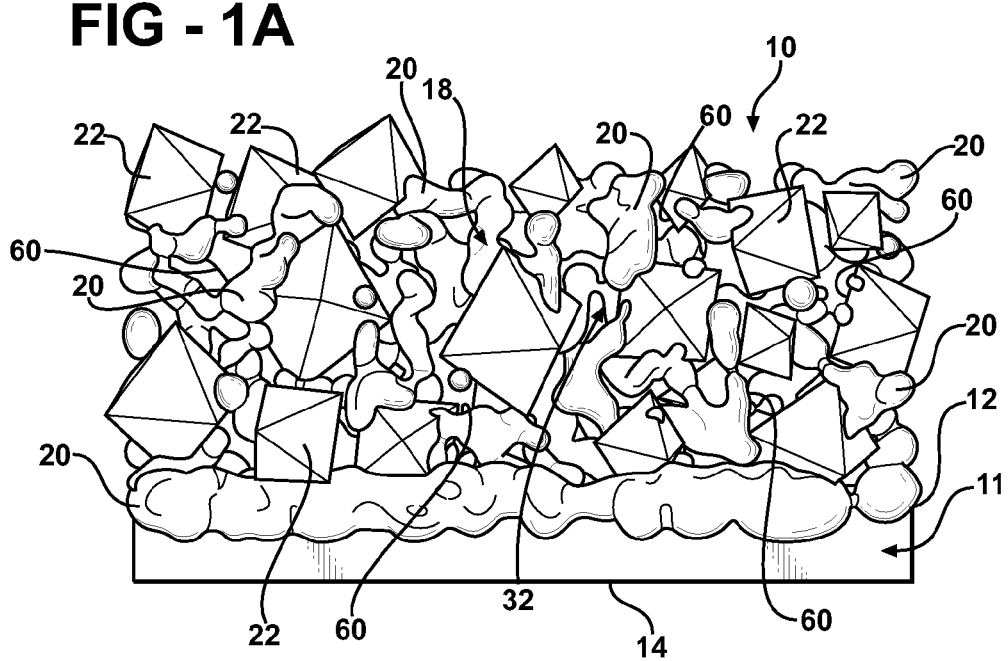
FIG. 1A illustrates cross sectional view of a structure on an inventive electrodes such as a cathode and an anode formed metal current collector and active porous layer wherein particles of an active material are represented by crystals of cubic and tetragonal morphology interconnected with a multitude of other particles of circular shape representing accreted and crystallized drops of melted metal current collector.
Figure 1B:
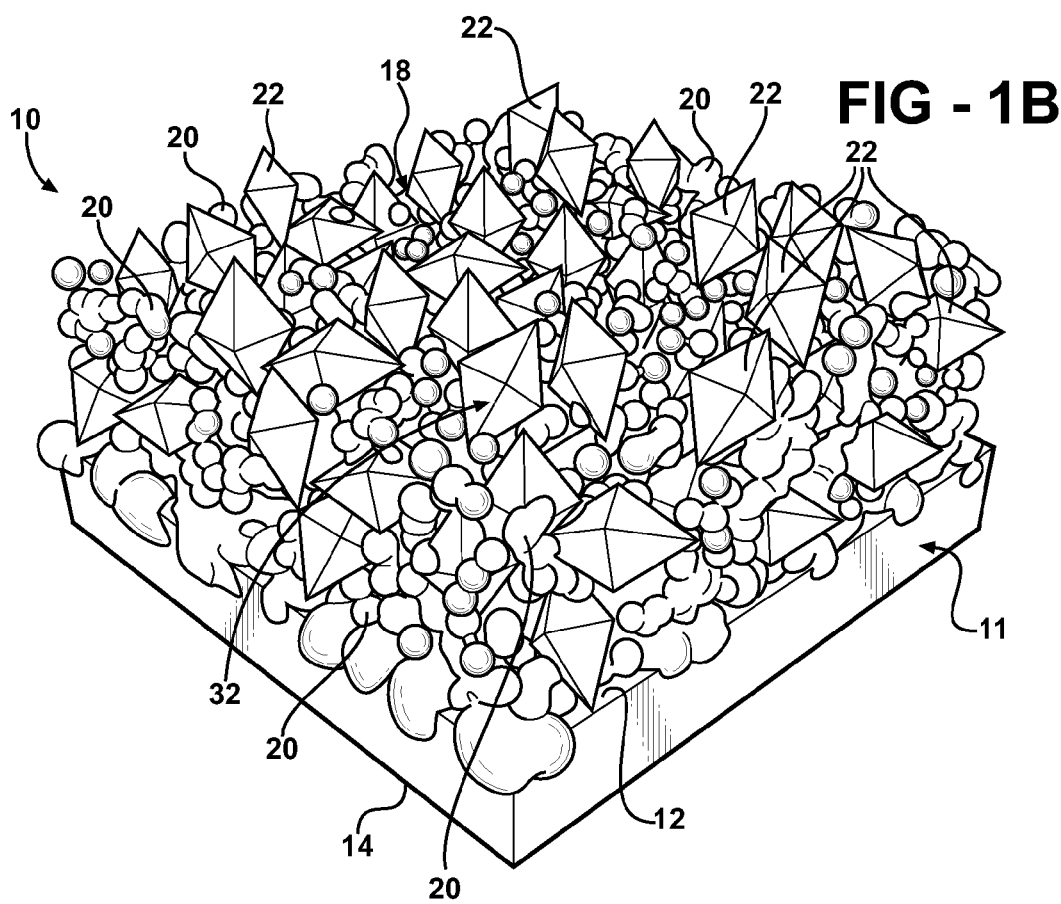
FIG. 1B illustrates a perspective view of the structure of the electrode of FIG. 1A.
Figure 1C:
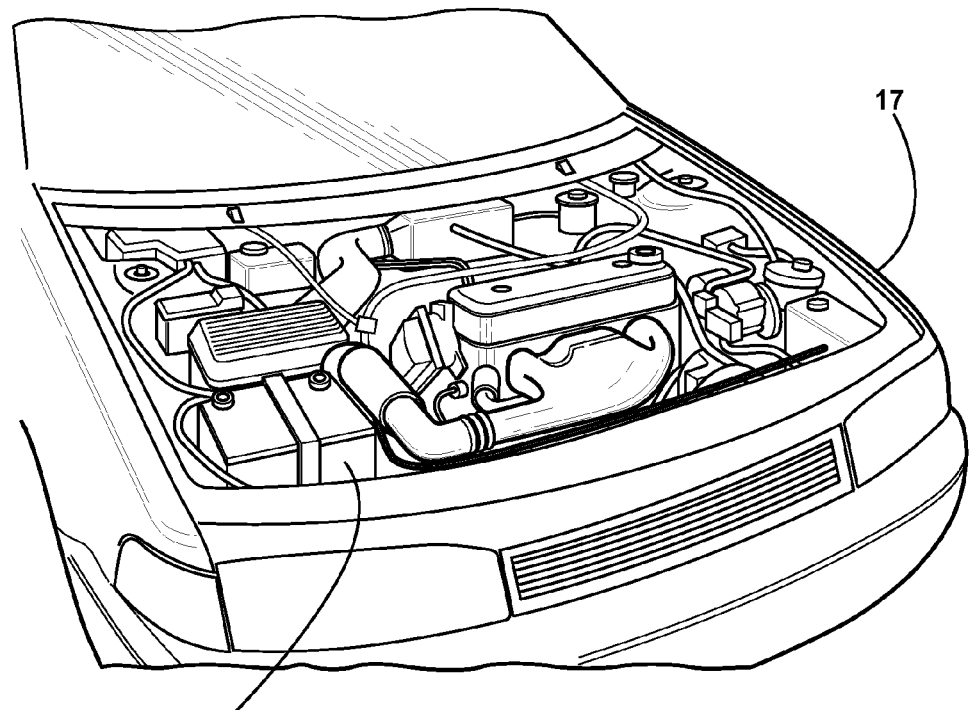
FIG. 1C illustrates an environmental view of an automobile having a battery disposed therein.

Referring to the Figures, wherein like numerals indicate like or corresponding parts, an electrode of the present invention is generally shown at 10. The electrode 10 of the present invention is formed from a metal tape, i.e. foil, generally indicated at 11 and shown fragmentally in FIGS. 1A to 1B, 3A through 3F, and 6A to 6B, is used to form a first electrode such as an anode and a second electrode such as cathode (both not shown), spaced by a separator and combined into a cell (not shown) for producing electric power without limiting the scope of the present invention. The metal current collector 11 of the first electrode and the second electrode has opposed sides 12 and 14, as best illustrated in a cross sectional view shown in FIG. 1A. The electrodes are combined into at least one cell used for a battery 15 for an automotive vehicle 17. The present inventive concept has various other applications including and not limited to high efficiency thin-film photovoltaic solar cells for cost-effective renewable energy, fuel cell components such as catalytic membranes for environmentally friendly power supplies, super capacitors for smaller and lighter portable handheld devices such as cell phones, laptops, thin film sensors for more effective monitoring and control of temperature, illumination, and humidity, high-conductivity wires with low resistance adaptable for manufacturing of a wide variety of electronic devices, and the like (all not shown).

Figure 2:
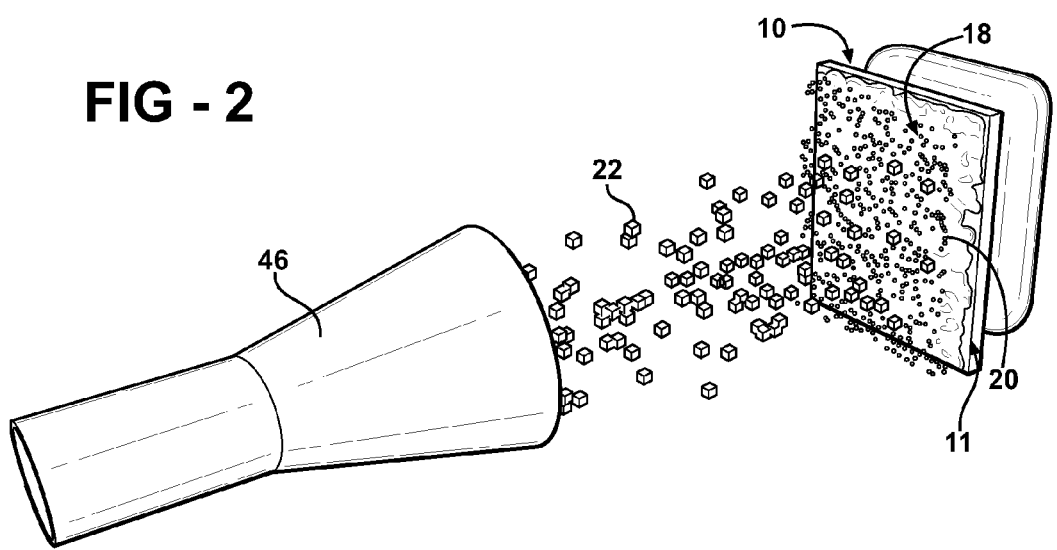
FIG. 2 is a fragmental and perspective view of a nozzle and ultrasonic device of an inventive apparatus for depositing the particles of active material onto the metal current collector.
Figure 6B:
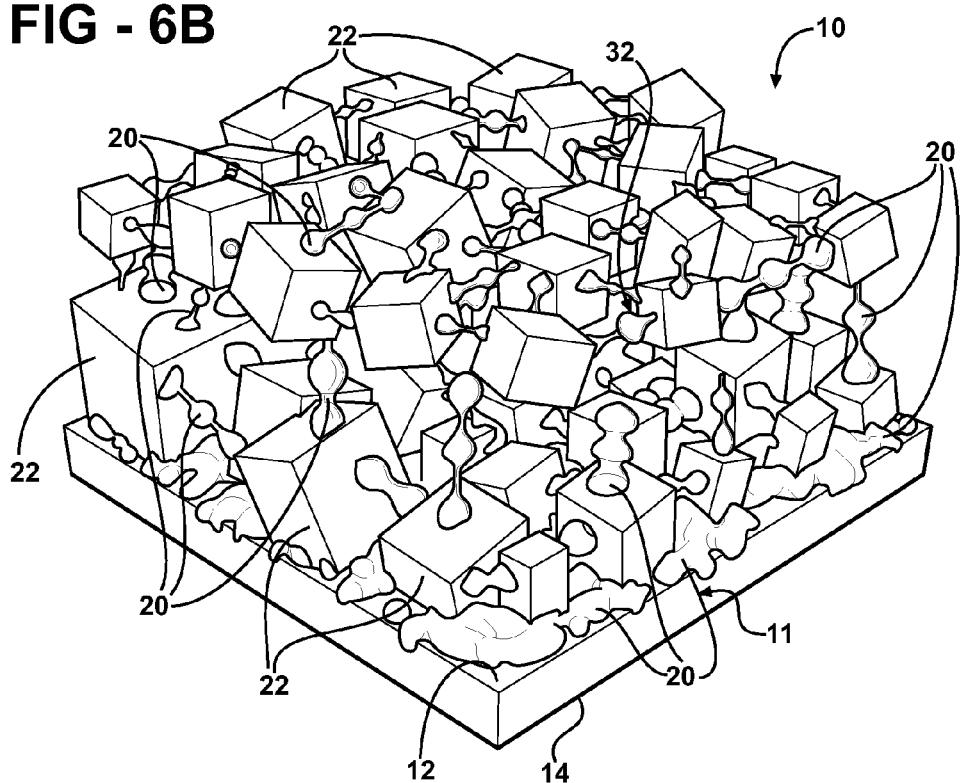
FIG. 6B illustrates a perspective view of the structure of the electrode of FIG. 6A after the solidification of the metal drops.

An active layer, generally indicated at 18 in FIG. 1A, for example, is formed on the metal current collector 11. Alternatively, the active layer 18 may be formed inside the metal current collector 11 (not shown). The active layer 18 is formed from first particles 20 being integral with and homogeneous with the metal current collector 11 and extending from the metal current collector 11 of at least one of the first and second electrodes. The first particles 20 are formed as a result of a multitude of second particle 22, impacting the metal current collector 11, as best shown in FIGS. 2 and 3A and 3B, resulting in local increased temperature of the metal current collector 11, which locally melts, as shown in FIGS. 3C and 3D, as the second particles 22 are at least partially penetrate the metal current collector 11

As best illustrated in FIGS. 3E and 3F, the impact of the second particles 22 onto the melted metal current collector 11 results in multitude of aerosol drops 24 under the condition of ultrasonic waves applying to the current collector 11. Aerosol drops are 24 separated from the metal current collector 11, as best illustrated in FIGS. 3E and 3F. The active layer 18 is formed in response to solidification of the aerosol drops 24, which follows local melting and ultrasonic cavitations of the metal current collector 11 thereby forming the first particles 20. The first particles 20 are integral with the metal current collector 11 and present circular or globular configuration, as view in a cross section. The second particles 22 are formed from of active material, other that the metal current collector 11, and may present a rectangular or any other configuration, and the like, as best shown in FIGS. 1A and 1B and 6A and 6B, without limiting the scope of the present invention. The circular configuration of the second particles 22, as shown in FIGS. 3A through 3F are for illustrative purposes only without intent to limit the scope of the present invention.

The active material of the second particles 22 includes and not limited to silicon, carbon, germanium, oxides, salts, ceramic components, $LiCoO_2$, $LiMn_2O_4$, $LiFePO_4$, $MnO_2$, Li, Si, C, Ge, SnO, $SnO_2$, and the like, without limiting the scope of the present invention. The first and second particles 20 and 22 are connected with one another to form a porous grid, generally indicated at 32 in FIGS. 1A and 1B and 6A and 6B of a three dimensional configuration of the active layer 18 disposed on the metal current collector 11 thereby resulting in the metal current collector 11 being integral with the active layer 18. The grid 32 is further defined by the first particles 20 being continuously connected with the metal current collector 11 thereby eliminating sharp interface between the grid 32 and the metal current collector 11. The first particles 20 are connected to the second particles 22 and the metal current collector 11 in a diffusible fashion with the second particles 22 being at least partially exposed through and beyond the grid 32.

Alternatively, the second particles 22 are inside the grid 32 of the active core 18 and do not exposed beyond the active core 18. The first particles 20 and the second particles 22 are free from low conductivity films at interface defined between the first and second particles 20 and 22 and the metal current collector 11. The first particles 20 are fused with one and the other thereby forming an inter-layered structure of the grid 32 with the second particles 22 disposed therebetween. The second particles 22 and the metal current collector 11 define points of contacts having a thermal decomposition temperature being lower than a melting temperature of the first particles 20. The second particles 22 present a size ranging from at least 50 nm and up to 500 nm. The first particles 20 present a size ranging from at least 5 nm and up to 100 nm.

As best illustrated in FIG. 1A, for example, the grid 32 presents a plurality of pores, only some of the pores are shown at 36. The grid 32 may present 60 percent of the pores 36 and 40 percent of the first and second particles 20 and 22 of a total volume of the active layer 18. This ratio is not intended to limit the scope of the present invention. The pores 36 may present 80 percent of the active layer 18 or even 99 percent of the active layer 18 or only 0.55 percent of the active layer 18. This ratio is not intended to limit the scope of the present invention. The active layer 18 is mixed with and covered by an electrolyte, (not shown) which presents liquid or non-liquid form.

Alluding to the above, one of the advantages of the present invention is the absence of an oxide film at contact points the first and second particles 20 and 22, which reduces electronic resistance at the interface of the cathode's active substance and metal binding. Multitude of contact points defined between the particles 20 and 22 and the metal current collector 11 expose the greater part of the active layer 18 open to electrochemical interaction with the electrolyte. The size of the first particles 20 as viewed in cross section is between 5 to 100 nm. The size of the second particles 22 formed from the active substance is between 50 to 500 nm. Based on the results of the test conducted by the applicant through a quantitative electron-microscopic analyses, the average number of contacts of the metal, i.e. the first particles 20 and the metal current collector 11 with the second particles 22 of the active material is 25 through 32 per square micron of particle surface, thereby providing reliable and improved outlet of electrons to the metal current collector 11 during cyclic changes in active substance particle size during reversible electrode operation in the cell (not shown). In some applications of the present invention the three-dimensional grid 32 has low thickness and the second particles 22 of form dense film on the electrode surface.

Application of the present invention can yield high quality porous ceramic nano-structured electrodes wherein the substrate material of the metal current collector 11 is intercalated with the coating material, i.e. the second particles 22 of the active material placed inside the voids or pores 36 formed during the fabrication of the metal current collector 11 having the inventive active layer 18 formed and continuously extending thereon. A distinguishing feature of the electrode structure having the metal current collector 11 presents a solid array of binding metal, i.e. the first particles 20 formed from material of the surface layer, i.e. the metal current collector 11 and the diffusion contact between the first and second particles 20 and 22 which are substantially identical to chemical composition. As such, the surface of the metal current collector 11 integrally transforms to the porous surface of the grid 32. The second particles 22 of nano-dimensions are located inside the loops formed by the first particles 20 presenting multiple points of contact therewith. An important feature of the grid 32 presents oxide-film free structure of the grid 32. The average number of contact points defined between the first particles 20 integral with the metal current collector 11 and the second particles 22 which was calculated by a quantitative electron-microscopic analyses is 25-32 per square micron of a particle surface thereby providing reliable outlet of electrons to the metal current collector 10 during cyclic changes in active substance particle size during reversible electrode operation in the battery.

Figure 7:
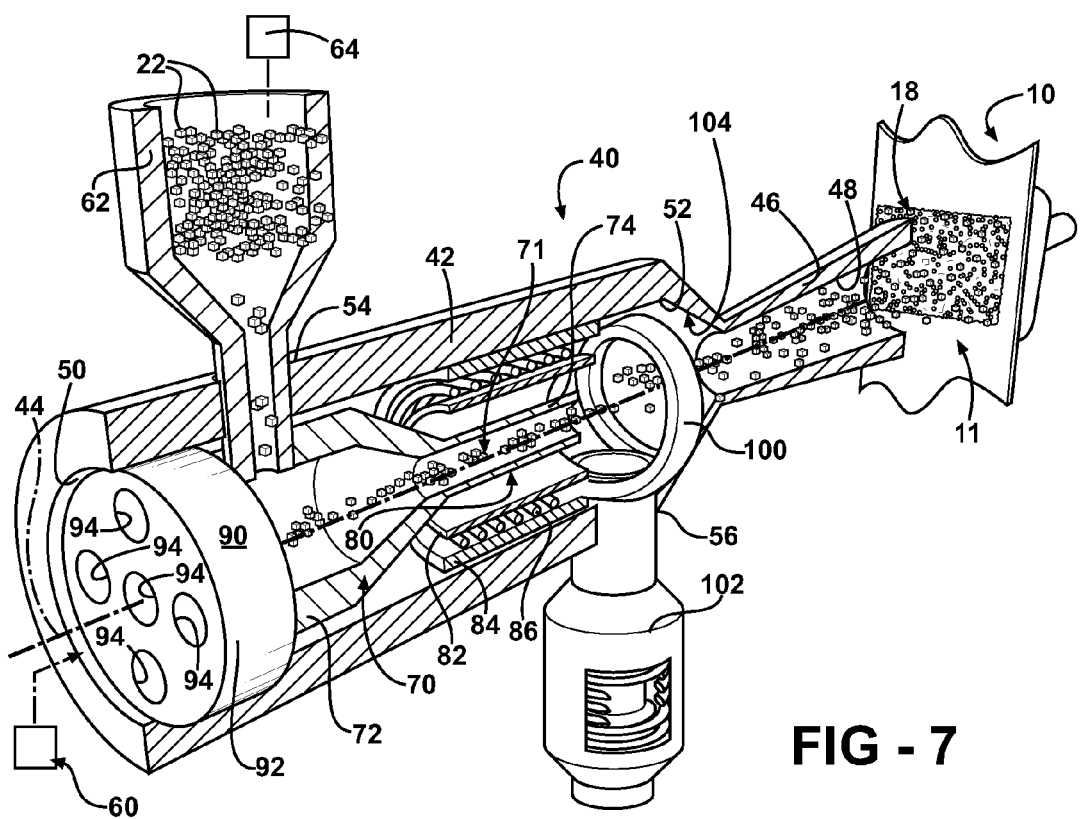
FIG. 7 shows a perspective and cross sectional view of an apparatus for forming active layer on the metal current collector of the present invention.

Referring to the FIG. 7, an apparatus of the present invention for forming the electrode 10 is generally shown at 40. The apparatus 40 is designed for high rate deposition of coating materials on single piece substrates as well as coating continuous tapes, such as the metal current collector 11 of the present invention of various length and width. The apparatus 40 includes a housing 42 surrounding a longitudinal axis 44 and extending to a Laval nozzle 46 having at least one ultrasonic chamber 48. The housing 42 includes a first end 50 and a second end 52 being opposite from the first end 50 and exposed to the Laval nozzle 46. The housing 42 also includes a pair of peripheral openings 54 and 56.

A fluid injection device, generally indicated at 60, fluidly communicates with the housing 42 for injecting pressurized fluid, such as, for example, gas, into the housing 42. The fluid injection device 60 will be discussed in great details as the description of the apparatus 40 proceeds. A funnel 62 of a delivery device 64 for transferring the particles 22 into the housing 42 is disposed in one of the peripheral openings 54 for introducing the particles 22 into the housing 42, wherein the particles 22 are mixed with the gas flow delivered to the housing 42 at low pressure, such as, for example, 0.1-1.0 atm in the dosage device 64 and is then transferred to an intermediate nozzle, generally indicated at 70. The intermediate nozzle 70 heats a homogeneous mixture 71 of the second particles 22 and the gas to a predetermined temperature thereby partially melting and evaporating the second particles 22 to increase the energy of the second particles 22 as the second particles 22 are directed through the Laval nozzle 46 of the housing 42 to collide with the metal current collector 10. The intermediate nozzle 70 presents a frustoconical body or a compression part 72 extending to a tubular nozzle 74 with the body 72 and the tubular nozzle 74 circumscribing the longitudinal axis 44.

A heating device, generally indicated at 80, surrounds at least partially the body 72 and substantially the elongated tubular nozzle 74. The heating device 80 presents an inner annular wall 82 and an outer annular wall 84. A coiled heater 86 is disposed between the inner and outer annular walls 82 and 84. The heating device 80 facilitates the transformation of the gas and the powder of the second particles 22 into the high energy homogeneous mixture 71. The quantity of the powder of the second particles 22 is adjusted based on application requirements. At the same time, the gas delivered under the low-pressure, such as for example, 5-20 atm through a mixing device 90 surrounding the longitudinal axis and disposed at the first end 50 for receiving the gas under the lower pressure to improve the injection of the particles 22 to the intermediate nozzle 70. The mixing device 90 is defined by a drum 92 having at least one channel 94 extending transversely therethrough. The channels 94 form a pinhole system used to improve mixing of the powder of the second particles 22 and the low pressured gas as the homogeneous mixture 71 is formed as the second particles 22 and the low pressured gas are transferred through the accelerating nozzle 74 of the intermediate nozzle 70.

An accelerating mechanism 100 is disposed about the longitudinal axis inside the housing 42 for increasing a speed of the homogeneous mixture 71 injected through the Laval nozzle 46 onto the tape 11 of the metal current collector 11. The accelerating mechanism 100 is further defined by a spiral member exposed generally to one of the peripheral openings 56 with an injector device 102 disposed in the peripheral opening 56 exposed to the spiral member for introducing the gas therein under high pressure of at least 10 and up to 60 atm. The gas is preheated to 100-600° C. before the gas is fed to a subsonic chamber, generally indicated at 104, of the Laval nozzle 46.

Alluding to the above, as the intermediate nozzle 70 is heated by the heating device 80 to a temperature which in some cases facilitates partial melting and evaporation of the powder of the second particles 22, the particle energy increases thereby improving deposition or binding properties as the second particles 22 are deposited onto the metal current collector 11. The pseudo-gas or the homogeneous mixture 71 is transferred to a turbo-accelerating area of the accelerating device 100 wherein the pseudo-gas acquires ultrasonic speed during transfer through the Laval nozzle 46.

Figure 8:
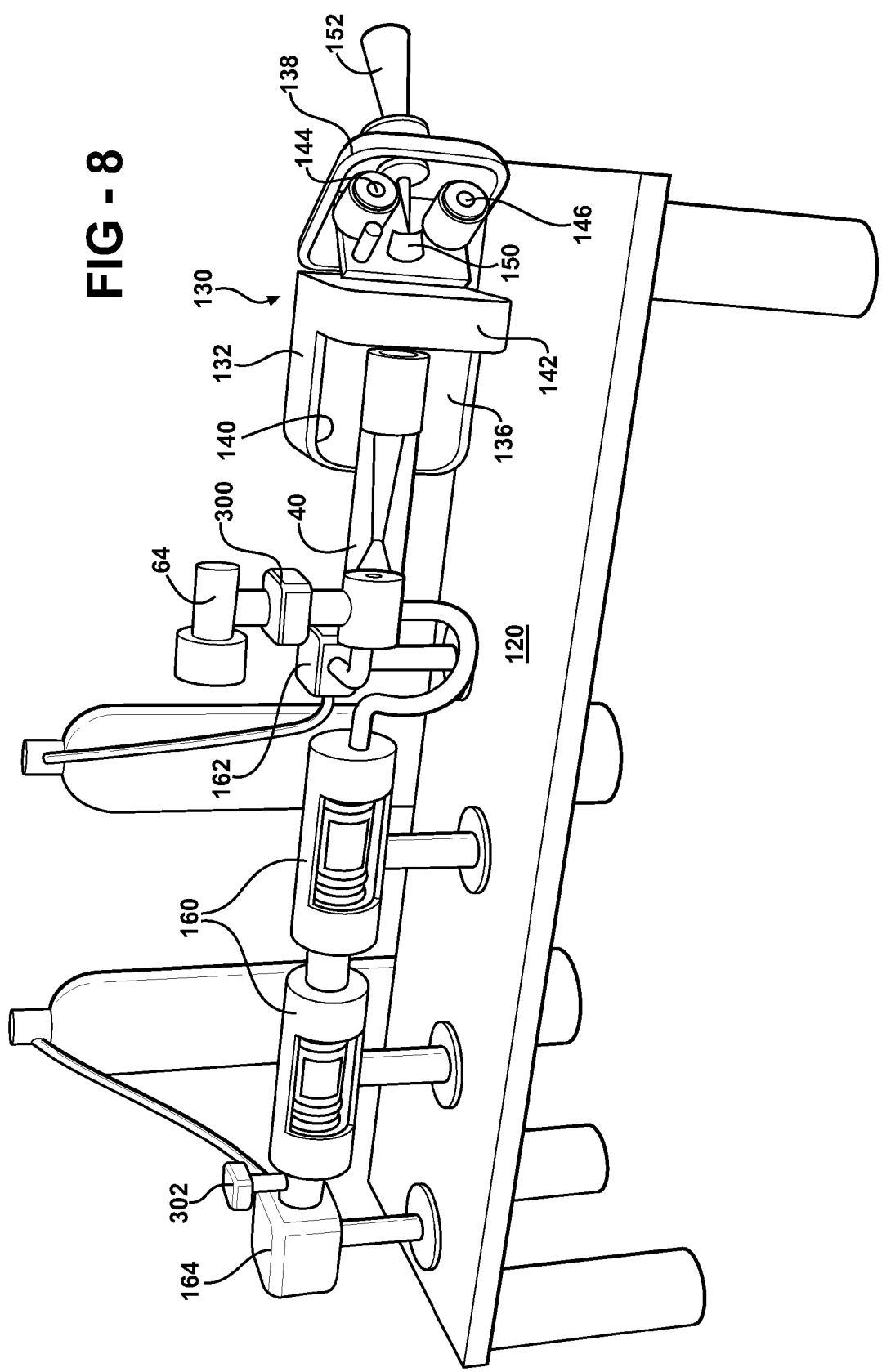
FIG. 8 is a front view of an installation adaptable to incorporate the apparatus of FIG. 7 for coating the tape of the metal current collector.

Referring to FIG. 8, the apparatus 40 is installed on a work surface such as, for example a support platform 120 or the like without limiting the scope of the present invention. Alternatively, the apparatus 40 may be a part of an assembly process. The apparatus 40 works in pulsed mode during single composite piece fabrication. A supporting unit, generally shown at 130, is used to roll and support the tape of the metal current collector 11 relative the Laval nozzle 46. The supporting unit 130 presents a support housing 132 having a first halve 136 and a second halve 138 pivotably connected to the first halve 136 to allow an operator (not shown) to remove and/or install the tape 11 of the metal current collector 10 or to service the support housing 132. The first halve 136 includes a side wall 140 and a frame 142 integral with and extending substantially perpendicular to the side wall 140. The frame 142 defined an open front exposed to the Laval nozzle 46. A pair of rollers 144 and 146 are operably connected to the second halve 138. The rollers 144 and 146 support and roll the tape 11 of the metal current collector relative the Laval nozzle 46 as the particles 22 are injected thereon during the deposition state of the formation of the active layer 18. The tape 11 abuts to a waveguide of ultrasonic probe 150 used for aerosol drops formation and to prevent clumping and non-uniformity of the active layer 18 as it is formed. An ultrasonic vibration emitter 152 is connected to the exterior of the second halve 138 and is connected to the waveguide of ultrasonic probe 150.

Figure 9:
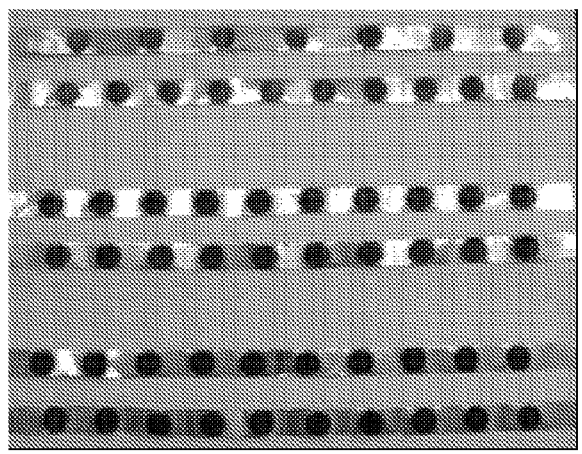
FIG. 9 illustrates a tape with electrodes of round shape obtained by the apparatus of FIGS. 7 and 8.

A pair of heaters 160 are supported by the platform 120 to heat the gas. A low pressure valve 162 is cooperable with the apparatus 40. After reaching the target temperature, the low-pressure system valve 162 and a high-pressure valve 164 are opened simultaneously to facilitate deposition of the particles 22 of the active material on the metal current collector 11 being pressed tightly to the waveguide of ultrasonic probe 150. The rollers 144 and 146 supporting the metal current collector 11 are subject to cyclical movements each time deposition of the second particles 22 onto the metal current collector takes place. A barrier (not shown) is adjacent the metal current collector 11 for limiting the area of pseudo-gas flow and to allow deposition of active layers of different sizes and configurations. The overview of the electrode tape 10 obtained using device 130 is shown on FIG. 9.

Figure 10:
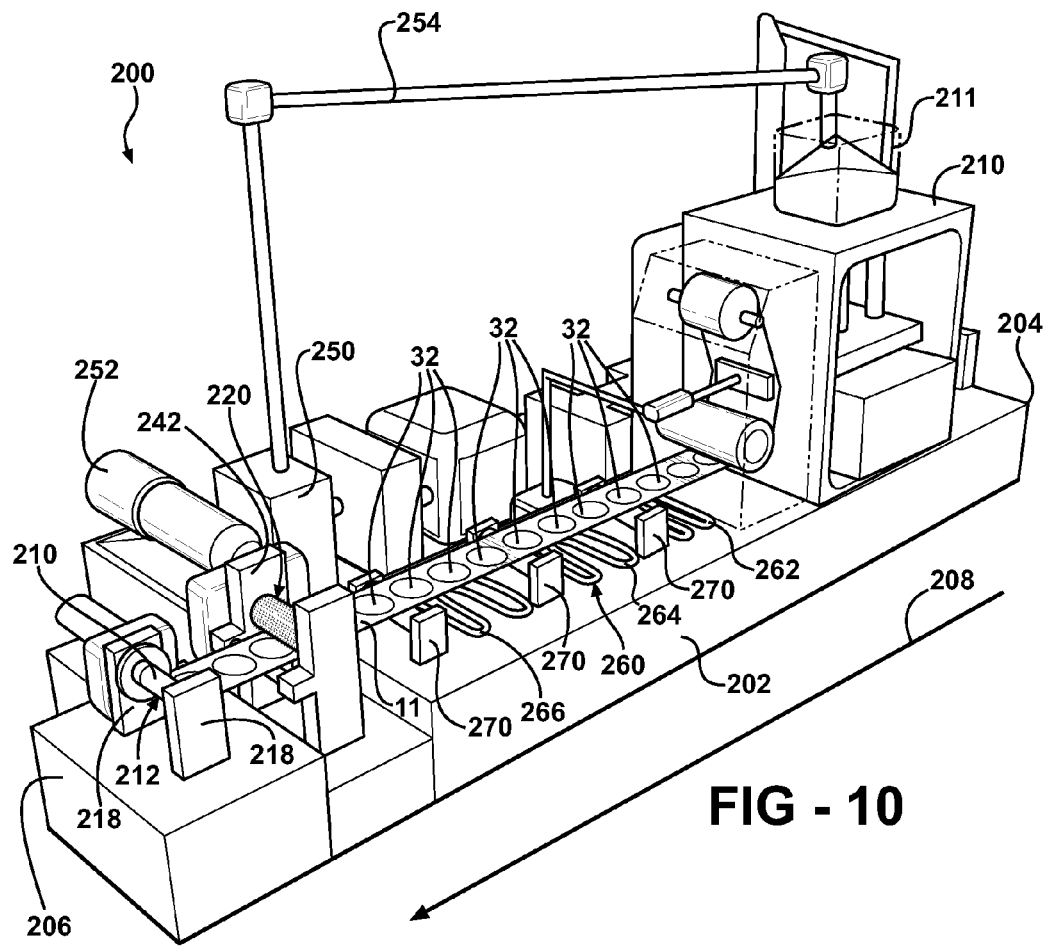
FIG. 10 shows a perspective view of another apparatus of the present invention adaptable for fabricating and coating a tape of 150 mm of the metal current collector.

Referring to FIG. 10, an alternative embodiment of the apparatus is generally shown at 200. The apparatus 200 is designed for fabricating and coating a 150 mm tape of the metal current collector 11. The apparatus 200 is not limited to the particular tape size and the 150 mm tape is disclosed herewith for exemplary purposes. The apparatus 200 includes a platform 202 presenting terminal ends 204 and 206 defining an assembly path 208 therebetween. A plurality of channels (not shown) are defined in the support platform 202 for reducing the weight of the support platform 202. A deposition unit 210 is located at one terminal end 204 for processing the tape 11 of the electrode 10 by depositing the second particles 22 of active material onto the tape 11. The deposition unit 210 includes the apparatus 40 as described above. A dosing system having a funnel 211 is used to the initial powder of active material powder is transferred to the deposition unit 210. The deposition unit 210 may include a Laval nozzle, not shown, presenting a flat (not axis-symmetric) configuration and having two ultrasonic chambers to increase efficiency of deposition compared to the Laval nozzle 46 of the apparatus 40. A rolling device 212 is spaced from said deposition unit 210 and is positioned at the other terminal end 206. The rolling device 212 collects the electrode tape 10 into at least one spool 216. The rolling device 212 includes a spool 216 for collecting the tape 11 and a pair of towers 218 for supporting the spool 216. The spool 216 is removable from the towers 218.

A calibrating mechanism, generally indicated at 220 in FIG. 10, is disposed between the deposition unit 210 and the rolling device 212 for frictionally engaging the grid 32 of active layer and at least partially entering into the grid 32 of active layer for forming additional pores 222 of the grid 32 of active layer, as shown in FIG. 14 in comparison with the grid 32 of the electrode 10 before engagement with the calibrating mechanism 220, as shown in FIG. 13, thereby increasing porosity of the grid 32 of active layer. The calibrating mechanism 220 is further defined by at least one roller 224 having a peripheral wall, generally indicated at 230 with a plurality of spikes 232 extending radially outwardly from the peripheral wall 230, as shown in FIG. 11. The spikes 232 are spaced from one another, as best shown in FIG. 12 with each spike 232 presenting conical side walls 234 extending to a peak 236 with at least one wall 234 of one of the spikes 232 being adjacent at least one wall 234 of another spike 232. The spikes 232 may present various configurations and shapes, such as circular, blade-like, and other. The conical shape of the spikes 232 as illustrated in FIGS. 11 and 12 are not intended to limit the scope of the present invention. The surface of the peripheral roll 230 has micro-profile notches (not shown) for other applications. The calibrating mechanism 220 also improves inhomogeneous in thickness of electrode tape 10.

Alluding to the above, a support roller 240 is adjacent the roller 224 to define a clearance therebetween to receive the tape 11 of the electrode 10. The roller 224 and the support roller 240 are adjustable relative to one another to receive the tapes 11 of various thicknesses. A hydraulic module 242 is defined in the calibrating mechanism 220 to keep the certain thickness and flatness of the electrode tape 10. A recycling mechanism 250 is adjacently disposed and fluidly communicates with the deposition unit 210 for collecting the excess of the particles 22 of active material and returning them to the dosing unit 211 to be applied to the tape 11 of the electrode 10. The calibrating mechanism 220 includes a driving unit 252 synchronized with the spools rotation driving units (not shown). A tubular member 254 extends from the separating unit 250 of the recycling mechanism to the funnel 211 for transferring the excess of the particles 22 of active material from said deposition unit 210 to the dosing system.

A heating element, generally indicated at 260, is positioned on the support platform and extending along the assembly path between the calibrating mechanism 220 and the deposition unit 210 for continuously heating the tape 11 of the electrode 10 to remove elastic stress as the tape 11 is moved along the assembly path 208. A plurality of support rollers 270 connected to and extend from the support platform 202 to support and move the tape 11 along the assembly path 208. The heating element 260 is further defined by a plurality of sections 262, 264, 266 disposed between the support rollers 270 along said assembly path for heating the tape 11.

Figure 10B:
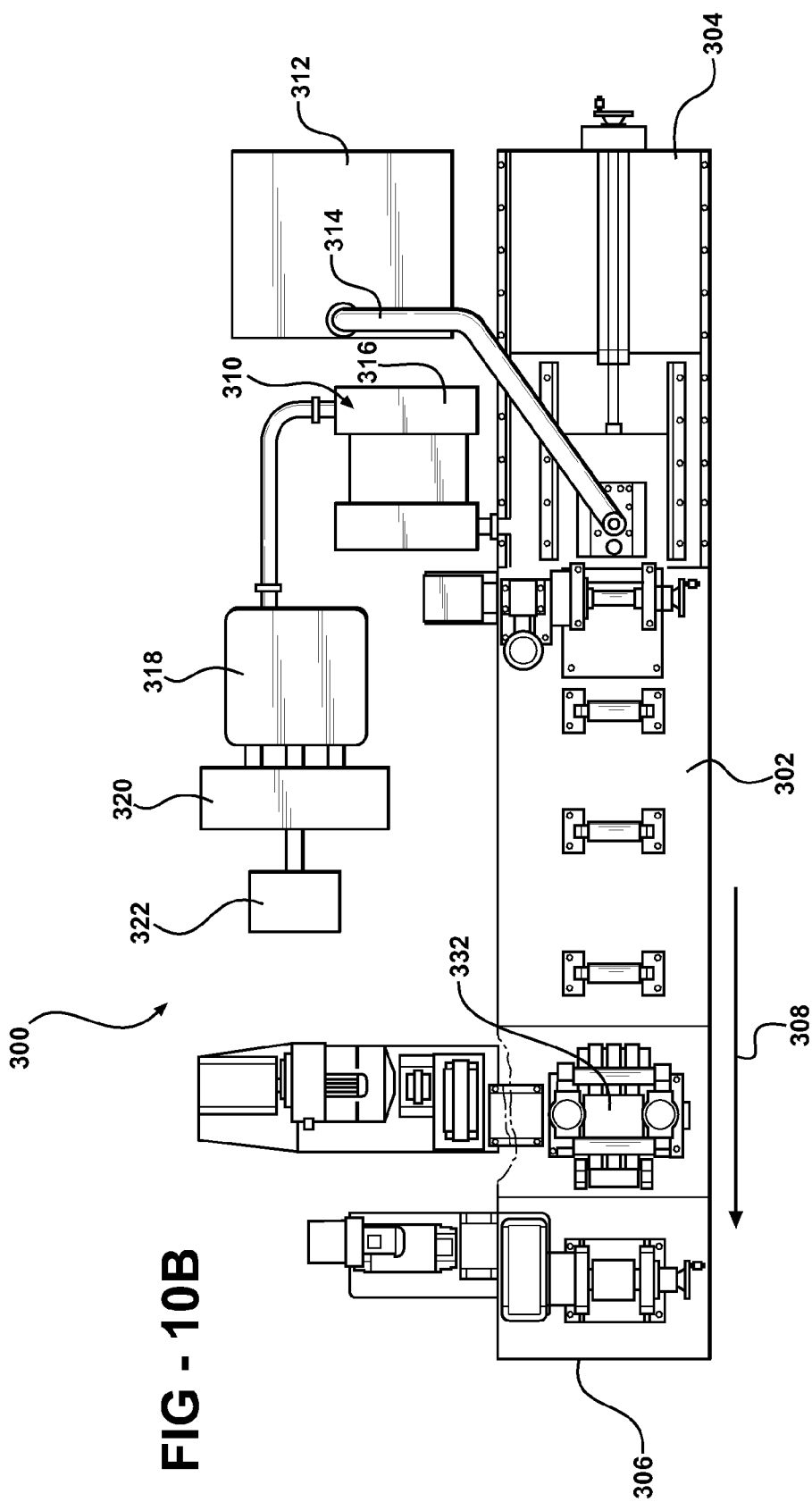
FIG. 10B shows a top view of an alternative embodiment of the apparatus of FIG. 10.

FIGS. 10A and 10B illustrate another embodiment of the apparatus generally shown at 300. The apparatus 300 is designed for fabricating and coating a 150 mm tape of the metal current collector 11. The apparatus 300 is not limited to the particular tape size and the 150 mm tape is disclosed herewith for exemplary purposes. The apparatus 300 presents a base 302 presents terminal ends 304 and 306 defining an assembly path 308 therebetween. A deposition unit or chamber, generally indicated at 310, is located at one terminal end 304 for processing the tape 11 of the electrode 10 by depositing the second particles 22 of active material onto the tape 11. The deposition unit 310 communicates with a compressor 312 through a compressed air bed 314. A decompressing system 316 communicates with the deposition unit 310 and a cyclone device 318. The cyclone device 318 is connected to a filter 320 for filtering and recycling the material the material as the material passes through a tank 322 for recycled material.

Figure 10C:
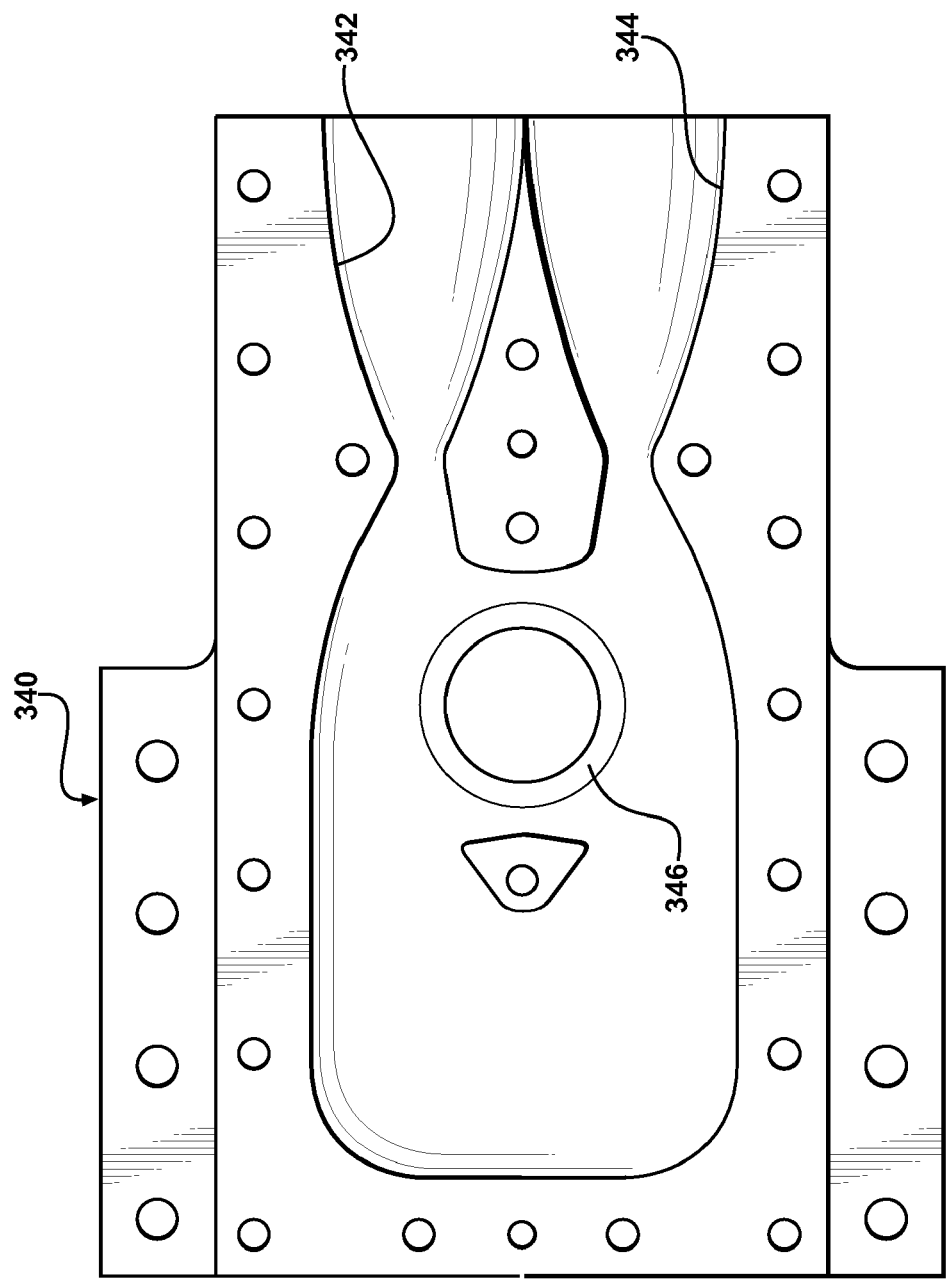
FIG. 10C shows a partially cross sectional view of a nozzle device of the apparatus of FIGS. 10A and 10B.
Figure 10D:
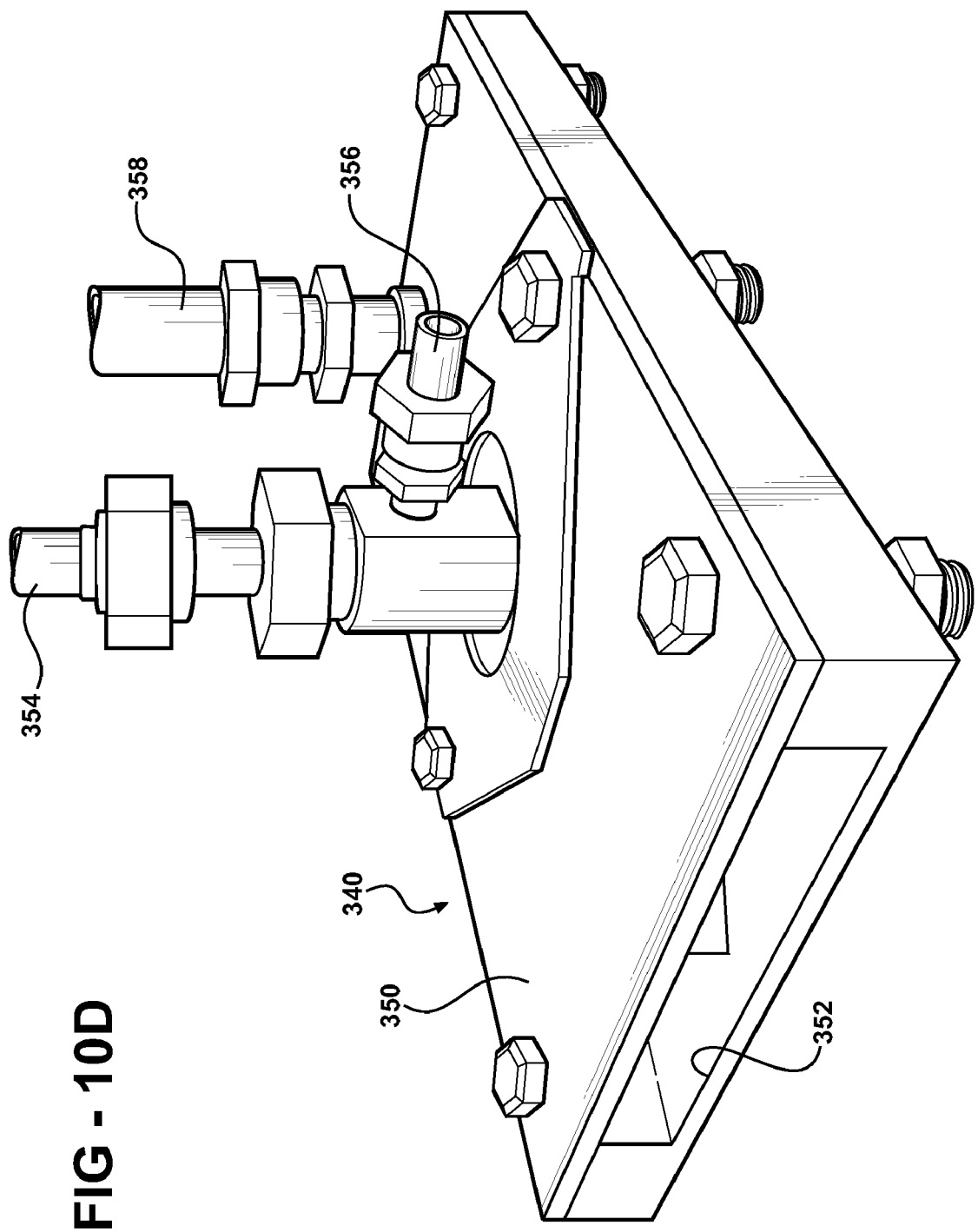
FIG. 10D shows a perspective view of a housing of the nozzle of FIG. 10C.

As best illustrated in FIG. 10B the deposition unit 310 includes a dosage system 324, a nozzle device 326, best shown in FIGS. 10C and 10D. A heat treatment device 328 and an ultrasonic block 330 are connected to the deposition unit 310. A calibration rolling unit 332 is located at the other terminal end 306. The nozzle device 326 includes a Laval nozzle 340, presenting a flat (not axis-symmetric) configuration and having two ultrasonic chambers 342 and 344, as best shown in FIG. 10C to increase efficiency of deposition compared to the Laval nozzle 46 of the apparatus 40. A turbo chamber 346 is defined in the nozzle 340 mixing the powder and the gas and increasing the speed of the homogeneous mixture as the mixture is injected through the two ultrasonic chambers 342 and 344. As shown in FIG. 10D, the nozzle 340 is disposed in a housing 350 having an open front 352 to which the two ultrasonic chambers 342 and 344 are exposed, a powder inlet 354, a gas inlet 356 fluidly communicating with the aforementioned dosage device, and a main gas inlet 358.

Figure 15:
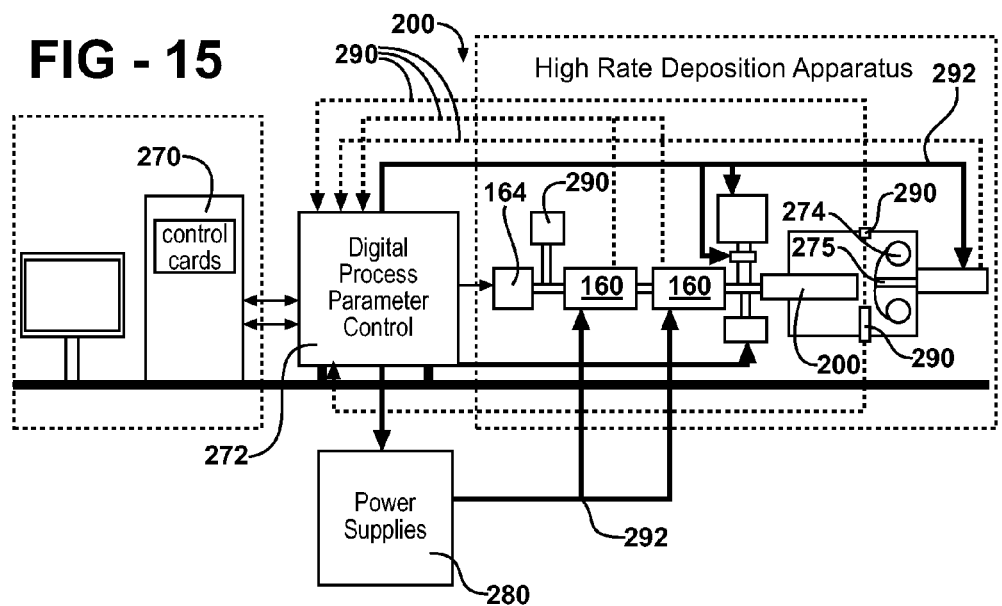
FIG. 15 shows a schematic vie of a digital control of the deposition parameters for high rate deposition apparatus of the present invention with incorporates at least one of the apparatuses shown in FIGS. 7 and 10.

FIG. 15 illustrates a schematic view of the process parameters controlling system of the apparatus 200. A controller 270 is operably communicating with of the deposition unit 210 for determining the size of the particles 22 of active material to be coated onto the metal tape 11 and the dimensions of the continuous surface of the metal tape 11 by comparing the size of the particles 22 of active materials applied to the metal tape 11 and the dimensions of the continuous surface with pre-determined size of the particles 22 of active material and the predetermined dimensions of the continuous surface stored by the controller. The controller 270 is further defined by a Digital Process Parameter Control unit (DPPC) 272 having a comparative software storing pre-determined size of the particles 22 of active material and the predetermined dimensions of the continuous surface and adaptable to integrate signals as the DPPC 272 scans the metal tape 11 to determine the offset between the particles 22 of active material as applied onto the metal tape 11 and the offset of the dimensions of the continuous surface. A stroboscopic laser device (not shown) communicates with the DPPC 272 to determine the size of the particles 22 of active material. The main parameters and functional aspects of the apparatus 200 controlled by the DPPC 272 during the fabrication process include and are not limited to a gas pressure in the compression chambers of the intermediate nozzle and Laval nozzle 46, rate of initial powder feed from the dosing system, ultrasonic excitation power, substrate and high-pressure gas temperature, distance between the Laval nozzle 46 and the temperature of the intermediate nozzle 70, and deposition time or speed of tape movement.

During the process of deposition, signals from the corresponding sensors 290 are received by to the DPPC 272. Using the comparison software, the DPPC 272 is adaptable to optimize the output parameters using drivers and power control devices 292. Output (controlled) parameters of the process include and are not limited to tape thickness, active material particles size near the substrate. During the deposition process, constant control is exerted over the process parameters. When parameter values vary from optimal or pre-determined, the controller 270 corrects the parameter values automatically. For example, the particle size and particle distribution in pseudo-gas is sensed by the aforementioned stroboscopic laser system. The controller 270 and the DPPC 272 are not limited to the apparatus 200 and are also adaptable to be used with the apparatus 40. The metal tape 11 is fed from a roll 274 that fits tightly to the underside of the ultrasonic emitter 275. After the grid 32 of active layer is formed, the metal tape 11 passes through heat treatment area defined by the sections 262, 264, 266 of the heating element 260 for removal of elastic stress and then transfers to the calibrating mechanism 220. The reduction ratio of the calibration mechanism 220 is configured for equalization of the thickness of the metal tape 11 and elimination of surface irregularity without causing plastic deformation of the active layer of the electrode tape 10 and without elimination of the porosity of the active layer. The active material deposition may be on the entire surface of the metal tape 11 or fragmentally, as shown in FIGS. 10 and 11. The apparatus 200 is designed for production of the electrodes having the thickness of the active layer of about 1 and up to 500 µm of and productivity up to 0.3-1.5 m/sec. The apparatus 200 is designed for operating with a compressor 280 which provides 15-20 m$^3$/min of dry air at a pressure of up to 30 atm.

As illustrated in Figures and according to the method of the present invention, a gas stream containing cathode or anode active substance particles 22 is heated to a predetermined temperature and is accelerated to supersonic speed through the Laval nozzle 46. The stream of the homogeneous mixture 71 is guided transversely to the metal tape 11. The stream contacts the waveguide bottom of supersonic vibrator. The fusion temperature of the metal tape 11 is to be less than fusion temperature or chemical degradation temperature of the particles 22 of active material. These temperatures are determined empirically as their values can significantly differ from those given in appropriate phase diagrams. Such variation is a consequence of the high degree of non-equilibrium of phase conversions associated with the highly energetic impact of the particles 22 onto the metal tape 11. Process parameters are calculated to result in a pseudo-gas stream of energy to be sufficient for local melting of the metal tape 11 in the area of interaction with the particles 22 thereby resulting in the formation of the aerosol drops also promoted by increased temperature of the metal tape 11 and ultrasonic excitation energy. The rate of the deposition of the homogeneous mixture 71 onto the metal tape 11 is determined by controlling essentially all of the process parameters. However, the rate of the deposition mostly depends on the pseudo-gas flow density at the Laval nozzle 46. Flow density is determined through the ratio of the weight of the particles 22 to the flow cross-section and deposition time.

According to the present invention, this value of this parameter is in the range of 0.01-25 $g/cm^2$*sec. The coefficient of material utilization increases with increasing flow density. The coefficient of utilization is the ratio of the quantity of coating material deposited on the metal tape 11 to the quantity of material initially fed into the apparatus 40 and/or 200. Thus, the method and apparatus of the present invention enable high rate high efficiency manufacturing of coated substrates under industrial conditions. The type of carrier gas used is dependant upon the active material to be coated. Air is suitable for deposition of heat-resistant ceramic materials. Materials that are prone to unwanted oxidation require inert gasses. Helium is one of the gasses used by this inventive concept. Various types of gas mixtures may also be used. Oxidation or other unwanted reactions with atmospheric gases can also be minimized by partial evacuation of the working chamber.

Additionally, the apparatus 40 and 200 may include a system for recovery of overspray or material not deposited onto the substrate (not shown). The apparatus 40 and/or 200 has a system for controlling the temperature and pressure of the pseudo-gas and the substrate tape or web temperature (all not shown). As alluded above, the apparatus 40 and/or 200 operates in pulsed mode as well as in continuous mode to form the metal tape 11 of the metal current collector with active layer thickness in the range of 0.5-300 μm, wherein the particles 22 of different size are accelerated up to different speeds under pre-determined gas pressure and temperature. The test results conducted by Applicant of the present invention indicate that particles 22 of ceramic material with a density of 4000 $kg/m^3$ in a size range from 5 micrometers and 40 micrometers have the difference in speeds at the Laval nozzle 46 exit in the range of 150-250 m/sec. Differences in speed values increase with increasing gas temperature and decreases with increasing gas pressure formed in the subsonic chamber 104 of the Laval nozzle 46. Dependence of particle speed on pressure on the high pressure side of the Laval nozzle 46 depends on particle size. At a pressure in of 50 atm., larger particles 22 having a size of at least 20 and up to 40 μm, are accelerated faster. At lower pressure of 5 to 30 atm., for example, the particles 22 of smaller size reach higher speeds. The extreme character of the dependence of the speed of different size particles 22 on temperature and pressure allows creation of conditions wherein larger particles experience multiple collisions with smaller particles. As a result of collisions with small particles 22, the larger particles 22 are fragmented. The highest particle mixing is received at pressures of 30-35 atm., with a gas temperature in the front of the Laval nozzle 46 of approximately 300° C.

In some applications of the present invention, different-sized particles with equal speed at the nozzle exit section are required. For implementation of such an effect, pressure reduction to 10-15 atm. is required. Data are given regarding an axis-symmetric Laval nozzle having a cross-section of 3 mm. The speed of the primary active material particles at the Laval nozzle 46 reaches 500-1200 m/s. Collision with the plastic metal substrate is non-elastic at such particle speeds. The kinetic energy of the particles during the short time of interaction with the metal tape 11 is almost completely converted to thermal energy, being partially transferred to the metal tape 11. However, the main part of energy is accumulated in the surface areas of the inculcated particles. The application of the present invention creates such conditions of interaction between particles and metal substrate that the surface density of thermal energy at the interface of contact between the particles 22 and the metal tape 11 in the range of $10^3$-$5 \cdot 10^4$ W/cm$^2$. Such values of energy density are obtained by regulating the speed of the particles 22, the density of the stream, and density of particle material itself. At these values of energy density, the local increase of the metal tape 11 temperature in contact with particles is in the range of 300-700° C. These temperature values are obtained by calculation on the basis of the theory of thermal conductivity, assuming heat diffusion from point source into infinite plane.

Initial temperature of the metal tape 11 is predetermined in such a way that when the particles 22 collide with the metal tape 11, local fusion results in the area of contact with each particle 22. At the same time, areas of the metal current collector 11 not contacting with the particles 22 remain in the solid state. In some applications of the present invention, the particles 22 of the initial active substance are heated before the subsonic chamber 104 of the Laval nozzle 46, thereby giving rise to improved stream homogeneity to positively affecting the deposition characteristics of the particles 22. The formation of the aerosol drops 24 from the metal results in response to the impact of the particles 22 onto the metal tape 11 and applying the ultrasonic vibration. The dimensions of the aerosol drops 24 and their quantity are determined by the vibration amplitude of the ultrasonic vibrator.

Alluding to the above, vibration is fixed in such a way that dimensions of the aerosol drops 24 do not exceed 5-100 nm. The interaction of the particle 22 with the metal tape 11 results formation of the area of increased pressure, i.e. a compressed gas layer formed adjacent the metal tape 11. The thickness of the compressed gas layer depends on the cross section the Laval nozzle 46 and the speed of the gas stream. The compressed gas layer keeps the aerosol drops 24 near the metal tape 11 and prevents it from spraying beyond the metal tape 11. The cavitations and boiling stages of the inventive process prevent formation of the oxide film at the interface between the melted and solid particles, thereby decreasing electrode impedance. In certain applications of the present invention, spraying of the liquid phase can be so significant that the formation of the aerosol drops 24 occurs without application of supersonic excitation to the metal tape 11.

The following are preferable conditions for the aforementioned applications: low thermal conductivity, small size of the active substance particles 22, high particle density and speed formed inside the Laval nozzle 46. This method allows creation of thin layers of active substance with fixed composition, which is less than 2 μm. Formation of the aerosol drops 24 decreases thickness of the metal current collector 10 and is increased through increased stream of the particles 22 and the power of the supersonic excitation of the metal tape 11. However, in most cases, the thinning of the metal tape 11 may not exceed 10-15%.

During solidification phase of the present invention and after the interaction of the particles 22 with the metal tape 11 and fusion therebetween, heat is directed towards the metal tape 11. The aerosol drops 24 of the liquid metal are thus crystallized. As a result, sheets of solid metal are formed between the particles 22 resulting in formation of a structure presenting metal-ceramic material with open porosity. Based on the coefficient of surface tension of liquid metal and the nature of the liquefaction at the interface with the particles 22, metal agent presents a fibril or a plate structure. During the contact of the aerosol drops 24 with the particles 22 and subsequent crystallization, micro-cracks are formed in the particles 22, as shown in FIGS. 5A and 5B. On filling of gaps with liquid metal significant fractures appear inside them. The value of the disjoining pressure is in direct proportion to coefficients of surface tension and is inversely proportional to gap size.

Alluding to the above, this phenomenon is known as Rebinder's effect and results from moving of liquid phase along gap's surface under the action of molecular forces. Absorption of liquid phase deep into these gap leads to rapid fault propagation along in the same direction. This phenomenon leads to total or partial breakage of the particles 22 and decreases their average size. The aforementioned Rebinder's effect has force in cases where the body of liquid phase can gain access to the narrow gaps. The kinetics of the viscous fluid flow can be approximated on the basis of Puazel's equation. Calculations made for aluminum melt show that even during $10^{-7}$-$10^{-5}$ seconds its melt is capable to flow deep into the particles 22 at the distance of 10 times and more than size of the gap.

The Rebinder's effect in this case has physical meaning and leads to effective additional fining of the particles 22 of active material. As a result, the size of the particles 22 of active material deposited onto the metal tape 11 is 50-400 times as finer than size of initial material particles 22. The indicated degree of fining allows obtaining of nano-structure in the active layer of electrode (size of particles less than 100 nm) at the dimension of initial particles up to 40 μm.

Referring now to a metal solidification deep into the particles 22 of active material, it is important to note that after subsequent crystallization of the liquid metal in narrow gaps, additional open gaps or shells are formed. Their creation is based on volume effects during metal crystallization (the majority of metals in a liquid state have more specific volume than in the solid state). Formation of discontinuity flaws (gaps) in the particles 22 of the active material improves the characteristics of electrodes as used in batteries. This phenomenon takes place due to increased effective surface of the active substance particle contact with electrolyte and the metal substrate (or current collector in battery electrode applications). The above processes proceed continuously during coating operations and provide formation of a porous metal-ceramic electrode with predetermined thickness. The thickness of the electrode active layer is determined by quantity of melted metal aerosol, which appears from the interaction of the first portion of the coating material particles with the metal tape 11.

In some applications of the invention for generation of the thick layers of active substance, substrate metal powder is added in the quantity of 3-15% to the powder of the active substance. In this case, the dimensions of the particles 22 are determined by calculation starting from equality of their speed and speed of the particles 22 of active substance particles in the Laval nozzle 46. The influence of the metal particles on the electrode structure formation is shown in the FIGS. 4A and 4B. FIG. 4A illustrate a metal particle on the surface of one of the active material particle 22. After collision between two particles, as shown in FIG. 4B, the metal particle melted and splashed into additional aerosol drops 24. This effect takes place during the plurality of particles 22 impacts as shown in FIG. 6A. After solidification of the metal drops 20 the thick porous structure is formed forms, as illustrated in FIG. 6B. It is also possible to use a mixture of different active substance powders for improvement of electrochemical and physical properties of composite materials. Thus, in some applications of this invention, powders of other conductive materials are added to metal powder. For instance, addition of carbon materials' powder in the quantity of 5% significantly increases porosity of electrode active layer.

Figure 16A:
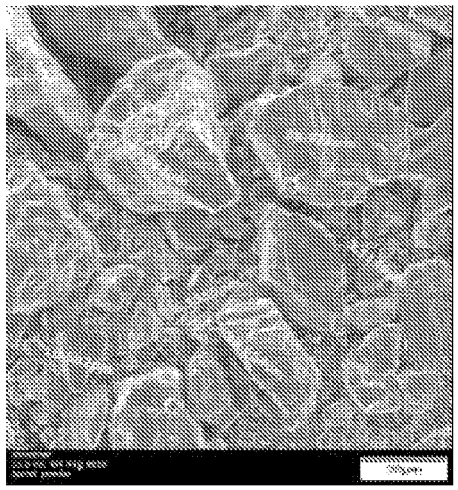
FIG. 16A shows the average size of initial spinel particles before their deposition.
Figure 16B:
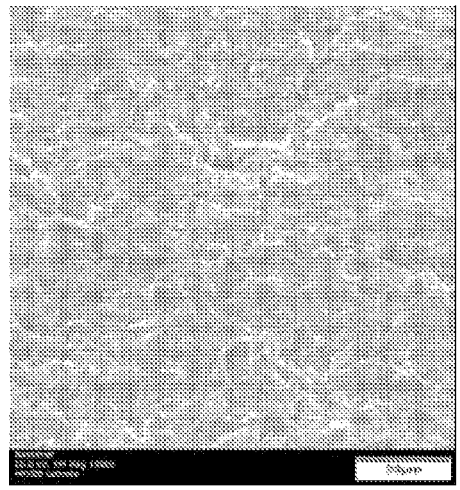
FIG. 16B shows the surface morphology of the electrode obtained using the initial particles shown in FIG. 16A.
Figure 16C:
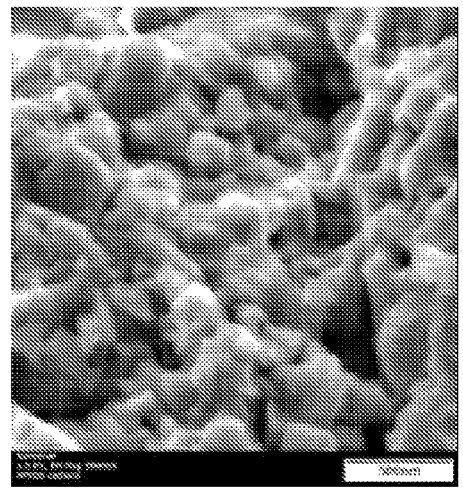
FIG. 16C shows the nano structural scale of the elements in active layer of the electrode, shown in FIG. 16B.

FIGS. 16A through 16C illustrates a first example presenting fabrication of cathode electrodes for Li-ion batteries. In the first example, lithium manganese oxide powder manufactured by Alfa Aesar, A. Johnson Matthey Company was used. The main fraction of this powder is sized at 40 μm, as shown in FIG. 16A. The powder was loaded in the funnel 62 of the dosage device 64. The metal current collector 10 of the metal tape 11 presented the thickness of 50 μm and width of 20 mm. The metal tape 11 was fixed in the feed and receiving rolls so that its surface was tightly fit to the ultrasonic emitter waveguide 150 and a layer thickness measurement device (not shown). Helium at a pressure of 30 atm and a temperature of 300° C., obtained by the heating elements 160 as shown in FIG. 8, was fed into the apparatus 40 through a valve 300. The underside of ultrasonic waveguide has a temperature of 200° C. The ultrasonic transducer probe 152 is then turned on with the frequency 22 kHz and 20 μm amplitude. A shutter is opened and initial powder in the quantity of 30 mg is introduced to the intermediate nozzle 70. Thereafter, the shutter is closed and valves 162 and 164 are opened. The valve opening time was fixed in real time using a pressure controlling device 302 and was set at 0.05 sec. A circular barrier (not shown) is positioned in front of the metal tape 11. This barrier forms the shape and dimensions of evaporated layer. The ultrasonic transducer is then turned off and process was then repeated to receive the electrodes with the 16 mm diameter of active material formed on the tape 11 of the metal current collector 10. The active layer weight of each electrode is 20-21 mg.

Figure 17A:
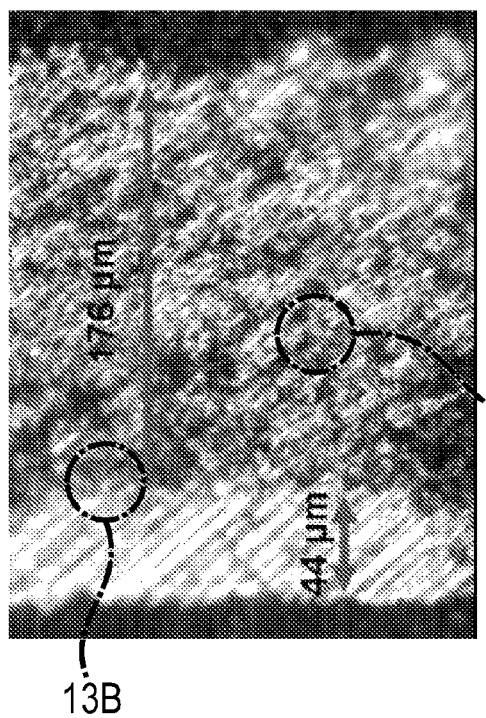
FIG. 17A shows the cross section of the cathode electrode based on Li Mnsub2Osub4 with the weight of active layer 20-21 milligrams.
Figure 17B:
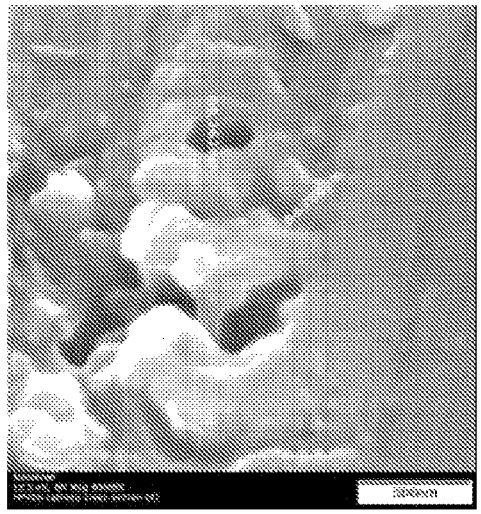
FIG. 17B shows the current collector-active layer interface structure for the electrode shown in FIG. 17A.
Figure 17C:
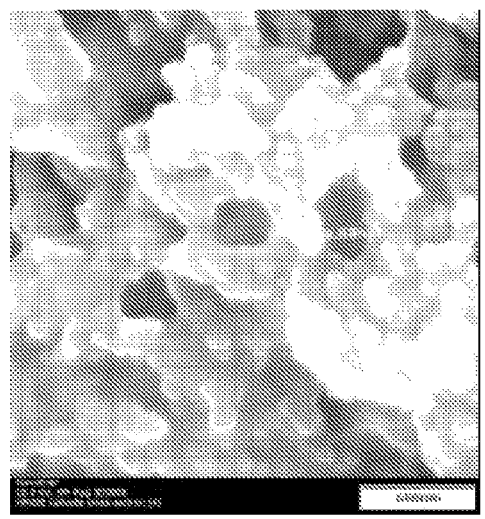
FIG. 17C shows porous nano scaled structure in the middle of active layer of the electrode shown in the FIG. 17A.
Figure 18A:
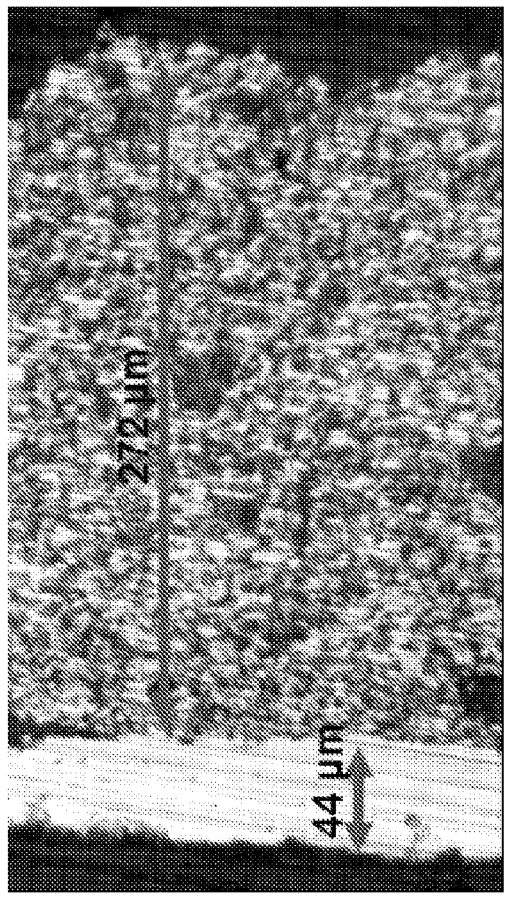
FIG. 18A shows the cross section of the cathode electrode based on Li Mnsub2Osub4 with the weight of active layer 37 milligrams.
Figure 18B:
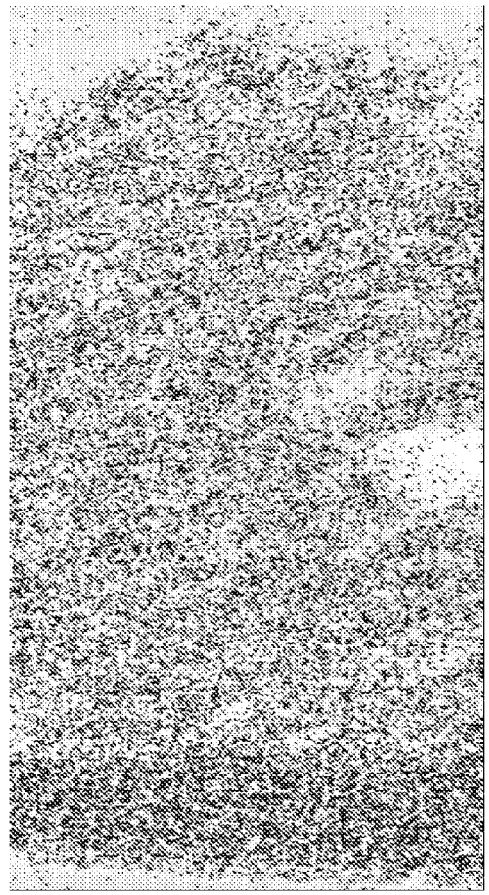
FIG. 18B shows the homogeneous Aluminum (black spots) and Manganese (grey spots) distribution alongside the cross section of the electrode shown in FIG. 18A.
Figure 19A:
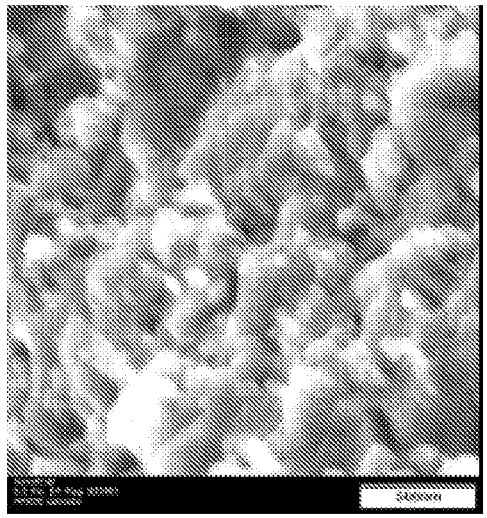
FIG. 19A shows the surface morphology nano scaled porous structure of the cathode electrode with the density of active material 1.1 milligram per sq. cm.
Figure 19B:
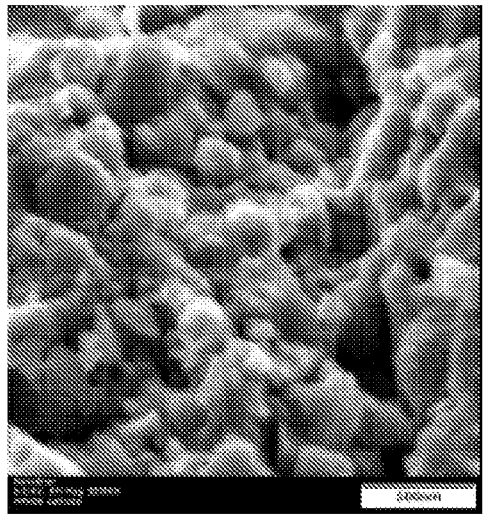
FIG. 19B shows the surface morphology nano scaled porous structure of the cathode electrode with the density of active material 0.7 milligram per sq. cm.
Figure 19C:
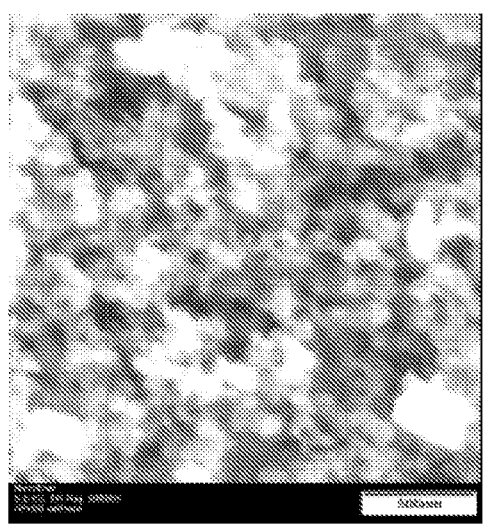
FIG. 19C shows the surface morphology nano scaled porous structure of the cathode electrode with the density of active material 0.2 milligram per sq. cm.
Figure 19D:
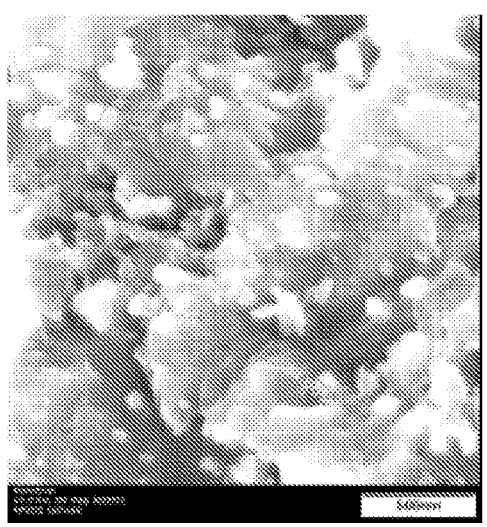
FIG. 19D shows the surface morphology nano scaled porous structure of the anode electrode with the density of active material 0.35 milligram per sq. cm.

Comparative analysis of structural disparity of the electrode surfaces and the initial material particles shows that the spinel particle size in electrodes is more than in 200 times smaller than in initial powder and is in the 70-100 nm range, as shown in FIGS. 16B and 16C. For definition of active layer thickness and structural characteristics, electrodes were impregnated with epoxy and subjected to a vacuum. After solidification they were cut perpendicular to the surface using ULTRAMICROTOME device (not shown). The resulting sections are then analyzed using optical and scanning electron microscopy analysis. The results of this analysis are represented in FIGS. 17A, 17B, 17C. The electrode active layer has a porous homogeneous structure with the metal current collector 10 having a decreased thickness by 5-6 μm. This fact indicates that about 10% of aluminum from current collector was used for liquid aerosol formation during the active layer formation. FIG. 17B shows the fine structure of the interface between current collector and active layer. One can see than aluminum fibers have a diffusion contact with current collector. The current collector continuously transforms to the active layer increasing the adhesion strength and electric conductivity of the electrode. Active layer structure in the central part of its section, shown in FIG. 17C, is characterized by open porosity and active material particles ranging in size from 20-200 nm. Aluminum fibers size is in the 20-200 nm range as well. FIGS. 18A and 18B illustrate another example of fabrication of thick layered active material composites of the electrode. The electrode in this example is obtained using the aforementioned method with the following changes in process parameters: the quantity of the initial active material powder is increased up to 55 mg., aluminum powder (3-8 μm) is added to the initial active material powder in the quantity of 5% of the active material weight and the amplitude of the ultrasonic transducer is increased up to 30 μm thereby receiving an electrode with an active material weight of 37 mg.

Alluding to the above, FIG. 18A shows the electrode cross-section, which was obtained by application of at least one of the aforementioned methods. The electrode active layer has a thickness of between 270 and 275 μm. Decrease in thickness of the current collector thickness was 5-6 μm as caused by aluminum aerosol formation. Aluminum corresponds to metal of current collector and Manganese corresponds to $LiMn_2O_4$ active material distribution along the electrode section is homogeneous as is demonstrated by the results of EDS analysis as shown in FIG. 18B. As illustrated in the first example, the cathode has open porosity and is characterized by structural components with dimensions in the range of 20-300 nm.

Turning to still another example of fabrication of electrodes with thin active material layer, the electrodes of this example are based on lithium manganese oxide (manufactured by LICO) and Si crystalline powder (manufactured by Alfa Aesar, A Johnson Matthey Company) were obtained using the process parameters indicated in Table 1 below:

TABLE 1

Process parameters and resulting characteristics for electrodes obtained by application of the present invention

| No | High pressure $P_1$ Atm. | Low pressure $P_2$ Atm. | T substrate ° C. | Mass of initial powder, mg | Surface density of active layer mg/cm$^2$ | Active layer thickness (μm) | Current collector, type and thickness, (μm) | Initial powder particles type and size (μm) | Active material particles size in deposited layer (nm) |
|---|---|---|---|---|---|---|---|---|---|
| 1 | 30 | 10 | 300 | 9.0 | 3.2 | 14 | Al, 15 | $LiMn_2O_4$, 7-10 | 10-200 |
| 2 | 20 | 6 | 300 | 9.0 | 2.8 | 15 | Al, 15 | $LiMn_2O_4$, 7-10 | 25-300 |
| 3 | 15 | 6 | 300 | 9.0 | 1.8 | 6 | Al, 15 | $LiMn_2O_4$, 7-10 | 40-300 |
| 4 | 20 | 6 | 200 | 7.0 | 1.1 | 4 | Al, 15 | $LiMn_2O_4$, 7-10 | 15-150 |
| 5 | 15 | 6 | 300 | 5.0 | 0.7 | 2 | Al, 15 | $LiMn_2O_4$, 7-10 | 20-250 |
| 6 | 15 | 6 | 300 | 2.0 | 0.5 | 1 | Al, 15 | $LiMn_2O_4$, 7-10 | 20-250 |
| 7 | 15 | 6 | 300 | 1.5 | 0.2 | 0.5 | Al, 15 | $LiMn_2O_4$, 7-10 | 20-250 |
| 8 | 20 | 10 | 350 | 4 | 0.35 | 3 | Cu, 50 | Si, less 40 | 30-500 |

These data show that the coefficient of material utilization, as determined by ratio of deposited material weight to initial weight. This coefficient increases with increasing gas pressure, increased substrate temperature, and increased ultrasonic excitation power. However, this coefficient depends mostly on the initial powder weight. With fixed evaporation time, increasing material weight leads to increased particle flow density, and therefore increasing of particle energy interaction with the substrate. Increases in gas pressure leads to increasing particle energy. Micro photos of electrodes surface with different surface layer density distribution (4, 5, 7, and 8) are represented in FIGS. 19A through 19D, respectively. The electrode number 6 produced by the third example was tested as a cathode for a lithium ion battery. The electrode specimen was placed opposite a lithium metal anode electrode with a separator in-between being filled with standard lithium ion electrolyte (LiPF6 in EC/DMC). The element was placed into coin-cell case and was being tested under galvanostatic and potensiodynamic conditions with different discharge currents. The charging current of the element corresponded to a half the value of the discharge current.

Figure 20A:
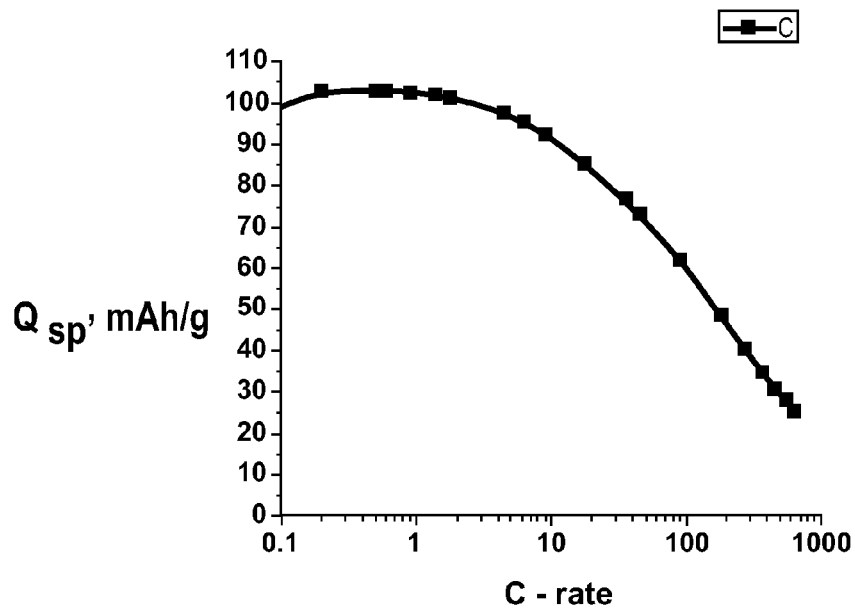
FIG. 20A shows the dependence of electrode capacity on the C-rate of discharge for the cathode electrode with the density of Li Mnsub2Osub4 0.5 milligrams per sq. cm.
Figure 20B:
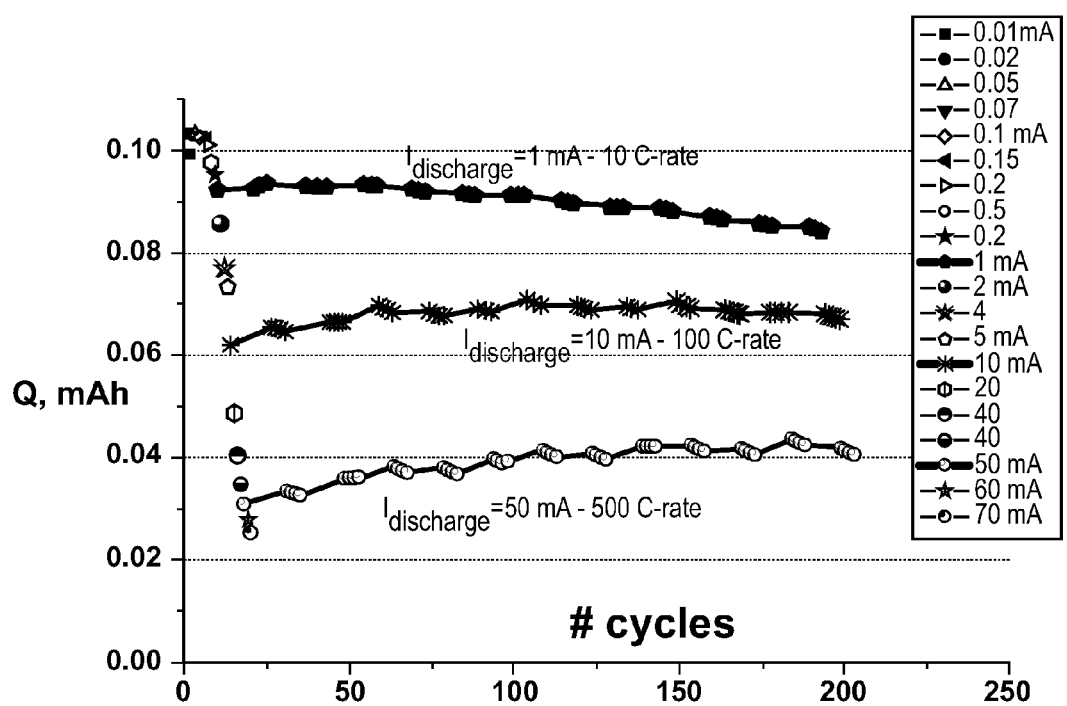
FIG. 20B shows the cycling performance of the electrode with the density of Li Mnsub2Osub4 0.5 milligrams per sq. cm. under different discharge currents.
Figure 21A:
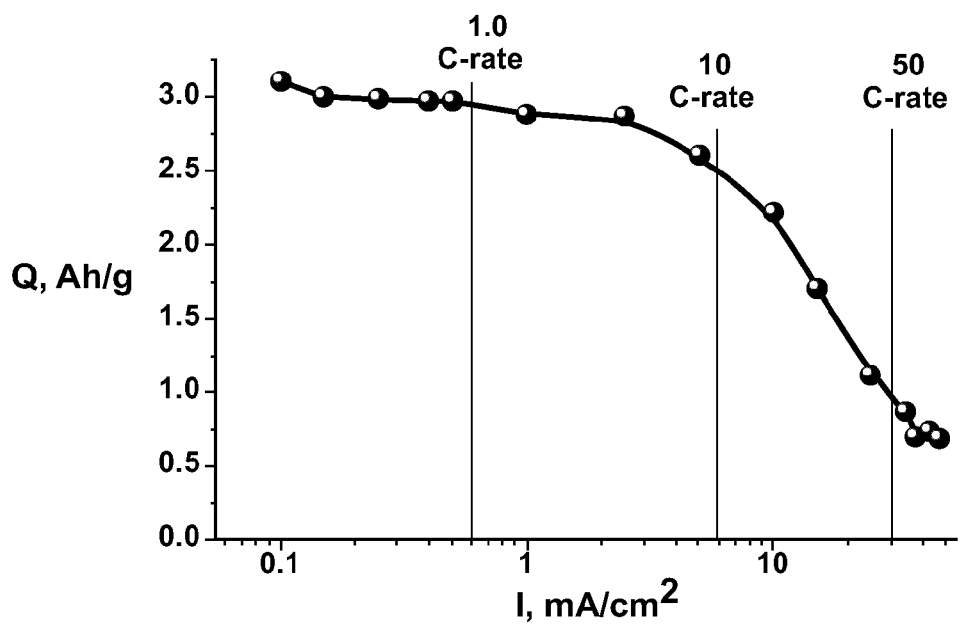
FIG. 21A shows the dependence of electrode capacity on the C-rate of discharge for the anode electrode with the density of Silicon 0.35 milligrams per sq. cm.
Figure 21B:
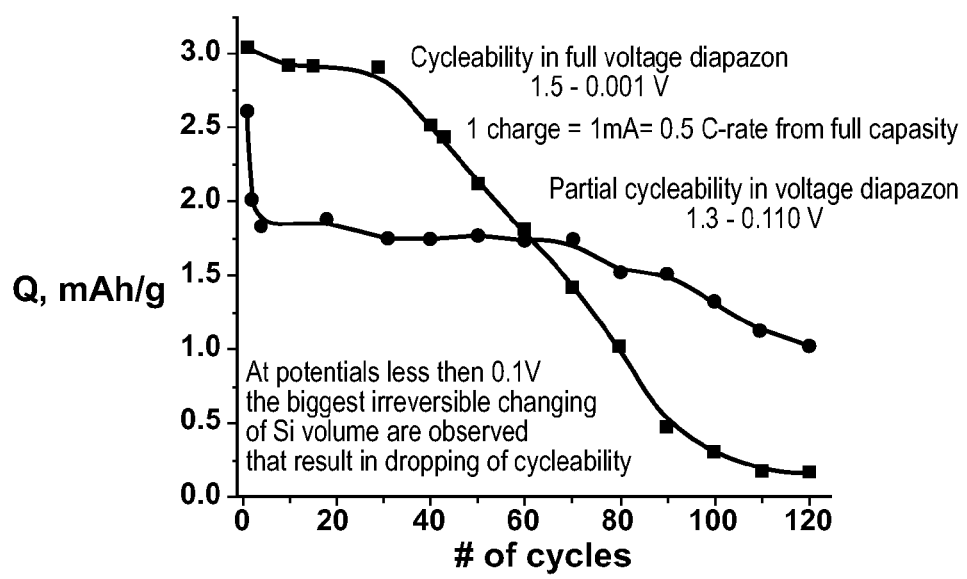
FIG. 21B shows the cycling performance of the anode electrode with the density of Silicon 0.35 milligrams per sq. cm. under different voltage diapason.

As illustrated in FIG. 20A, the cathode electrode presents an excellent capacity index, i.e. 65 per cent of the theoretical value, when discharge currents reach right up to 100 C. Capacity is not changed as a result of system cycling. Electrode charge and discharge capacity is practically the same, evidence of the high degree of reversibility of the cycling process demonstrated by this electrode, as shown in FIG. 20B. Determination of the impedance of the electrode has shown it to be low and having a tendency to further decrease during the process of cycling. Electrode number 8, obtained by the method of the third example, is tested in the capacity of anode for the lithium ion cell. The electrode sample was placed opposite to Li metal electrode with the separator in between and filled with standard Li-ion electrolyte (LiPF6 in EC/DMC). The element was placed into the body of the standard coin cell and tested in the galvanostatic mode at different discharge currents. The charge current of the cell corresponded to the discharge current. FIG. 21A illustrates the results showing that the Si anodic electrode has excellent indices of capacitance at currents of charge-discharge up to 100 C. Specific capacity during the first cycles is 3 Ah/g or more. At 100 C-rate, the anode gives 20% utilization, 600 mAh/g, more than the specific capacity for majority of cathode materials for Li ion cells. Test results also indicate that the lifetime cycling capacity of Si anode decreases after 25 cycles as shown in FIG. 21B. This effect can be explained by the significant volume change of Si during charge-discharge cycle. Cycle-ability can be significantly improved by shrinking the voltage range from 1.5-0.01 V to 1.3-0.110 V, FIG. 21B. The comparison of the aforementioned analytical results with other Si anode thin films performance (Journal of Power Sources 81-82__1999.233-236) shows outstanding advantages of Si anode obtained according to the method of the present application. The CVD-deposited Si film with a thickness three times less than electrode No. 8 provides only 1 Ah/g and shows reduced capacity after only 3 cycles.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that that invention will include all embodiments falling within the scope of the appended claims.

What is claimed is:

1. An apparatus for forming a cell producing electric power and having a first electrode and a second electrode formed from a metal tape for collecting current and a separator disposed between the first and second electrodes, said apparatus comprising:
    a work surface presenting terminal ends;
    a deposition device defined at one of said terminal ends for processing the metal tape and depositing particles of active material onto the metal tape for forming a grid of active layer;
    a calibrating device disposed at the other of said terminal ends for removing excess of the particles of active material from the metal tape and for forming pores in the grid and for rolling the metal tape into at least one roll; and
    a recycling mechanism adjacently disposed and fluidly communicating with said calibration device and said deposition device for collecting the excess of the particles of active material from said calibrating device and returning the particles of active material to said deposition device to be applied to the metal tape.

2. An apparatus as set forth in claim 1 wherein said recycling mechanism includes at least one receiving roll adjacent said calibration device for rolling the metal tape to the roll.

3. An apparatus as set forth in claim 2 wherein said work surface is further defined by a support platform extending along an assembly path and having a plurality of channels defined therein for reducing the weight of said support platform.

4. An apparatus as set forth in claim 3 including a heating element positioned on said support platform and extending along said assembly path between said calibration device and said deposition device for continuously heating the metal tape to remove elastic stress as the metal tape is moved between said calibration device and said deposition device.

5. An apparatus as set forth in claim 3 including a plurality of support rollers connected to and extending from said support platform for supporting and moving the metal tape between said calibration device and said deposition device.

6. An apparatus as set forth in claim 5 wherein said heating element is further defined by a plurality of sections disposed between said support rollers along said assembly path.

7. An apparatus as set forth in claim 6 wherein said deposition device includes an injector mechanism for deposition of the particles of active material under increased speed and injecting the particles of active material mixed with pressurized fluid against the metal tape.

8. An apparatus as set forth in claim 7 wherein said deposition device includes an accelerating mechanism for increasing a speed of the particles of active material mixed with the pressurized fluid.

9. An apparatus as set forth in claim 8 wherein said deposition device includes a Laval nozzle having at least one ultrasonic chamber.

10. An apparatus as set forth in claim 8 wherein said accelerating mechanism is further defined by a spiral member.

11. An apparatus as set forth in claim 7 including a funnel for introducing the particles of active material to said deposition device.

12. An apparatus as set forth in claim 7 including a tubular member connecting with said funnel and said recycling mechanism for transferring the excess of the particles of active material from said calibrating device and returning the particles of active material to said deposition device through said funnel.

13. An apparatus as set forth in claim 1 including a controller operably communicating with each of said deposition device and said calibrating device and said recycling mechanism.

14. An apparatus as set forth in claim 13 wherein said controller is further defined by a Digital Process Parameter Control unit (DPPC) having a comparative software storing pre-determined size of the particles of active material and adaptable to receive multiple signals from said DPPC to integrate said signals thereby determining the offset between the particles of active material as applied onto the metal tape.

15. An apparatus as set forth in claim 14 including a stroboscopic laser device communicating with said DPPC to determine the size of the particles of active material.

* * * * *